(12) United States Patent
Sakurai

(10) Patent No.: US 8,487,934 B2
(45) Date of Patent: Jul. 16, 2013

(54) DISPLAY APPARATUS AND COMPUTER READABLE MEDIUM

(75) Inventor: Takayuki Sakurai, Inagi (JP)

(73) Assignee: Casio Computer Co., Ltd., Tokyo (JP)

( * ) Notice: Subject to any disclaimer, the term of this patent is extended or adjusted under 35 U.S.C. 154(b) by 106 days.

(21) Appl. No.: 13/045,826

(22) Filed: Mar. 11, 2011

(65) Prior Publication Data

US 2011/0254857 A1    Oct. 20, 2011

(30) Foreign Application Priority Data

Apr. 16, 2010    (JP) .................... 2010-094613

(51) Int. Cl.
```
G06T 11/20     (2006.01)
G06T 17/05     (2011.01)
G06T 19/00     (2011.01)
G06T 11/60     (2006.01)
G06T 15/00     (2011.01)
G06F 17/18     (2006.01)
G06F 17/30     (2006.01)
```
(52) U.S. Cl.
CPC ........... *G06T 11/206* (2013.01); *G06T 11/20* (2013.01); *G06T 17/05* (2013.01); *G06T 19/00* (2013.01); *G06T 11/203* (2013.01); *G06T 11/60* (2013.01); *G06T 15/00* (2013.01); *G06F 17/18* (2013.01); *G06F 17/30572* (2013.01); *G06F 17/30716* (2013.01); *G06F 17/30769* (2013.01)
USPC ........ 345/440; 345/440.1; 345/441; 345/419; 345/619; 345/629; 345/427; 345/473; 345/421; 345/472

(58) Field of Classification Search
CPC ......... G06T 11/206; G06T 11/20; G06T 17/05; G06T 19/00; G06T 11/203; G06T 11/60; G06T 15/00; G06F 17/18; G06F 17/30572; G06F 17/30716; G06F 17/30769
USPC ............ 345/440, 440.1, 441, 629, 427, 473, 345/421, 419, 619, 442
See application file for complete search history.

(56) References Cited

U.S. PATENT DOCUMENTS

| | | | | |
|---|---|---|---|---|
| 5,815,143 | A * | 9/1998 | Jenney et al. ................. | 345/563 |
| 2005/0162405 | A1 * | 7/2005 | Ono et al. ..................... | 345/173 |

(Continued)

FOREIGN PATENT DOCUMENTS

| | | |
|---|---|---|
| CN | 1890694 | 1/2007 |
| CN | 101004748 | 7/2007 |

(Continued)

OTHER PUBLICATIONS

Japanese Office Action dated Jul. 12, 2011, issued in counterpart Japanese Application No. 2010-094613, and English translation thereof.

(Continued)

*Primary Examiner* — Javid A Amini
(74) *Attorney, Agent, or Firm* — Holtz, Holtz, Goodman & Chick, P.C.

(57) ABSTRACT

Disclosed is a display apparatus comprising: a display section including a first and a second display areas, which can set a first and a second coordinate systems; a memory storing an image file including image data, coordinate range data, and coordinate value table data; and a processor which performs: image file specifying processing specifying the image file; display processing which (i) reads out the specified data, (ii) controls a display of an image part among an image of the specified image data, (iii) sets the first coordinate system within a range overlapping the image part, and (iv) controls a display of plotted points of the first coordinate system, wherein the coordinate value table data correlates a coordinate value of the third coordinate axis with those in the first coordinate system, and the display processing sets the second coordinate system in the second display area, and controls a display of plotted points.

17 Claims, 14 Drawing Sheets

U.S. PATENT DOCUMENTS

| | | |
|---|---|---|
| 2005/0243086 A1 | 11/2005 | Schechter et al. |
| 2007/0103465 A1 | 5/2007 | Barenbrug et al. |
| 2009/0096790 A1 | 4/2009 | Wiedemann et al. |
| 2009/0290753 A1* | 11/2009 | Liu et al. .................. 382/100 |
| 2011/0242107 A1* | 10/2011 | Sakurai ..................... 345/440 |

FOREIGN PATENT DOCUMENTS

| | | | |
|---|---|---|---|
| JP | 2003-131655 A | 5/2003 | |
| JP | 2003-281102 A | 10/2003 | |

OTHER PUBLICATIONS

Chinese Office Action dated Aug. 2, 2012, issued in counterpart Chinese Application No. 2011100971806, and English translation thereof.

* cited by examiner

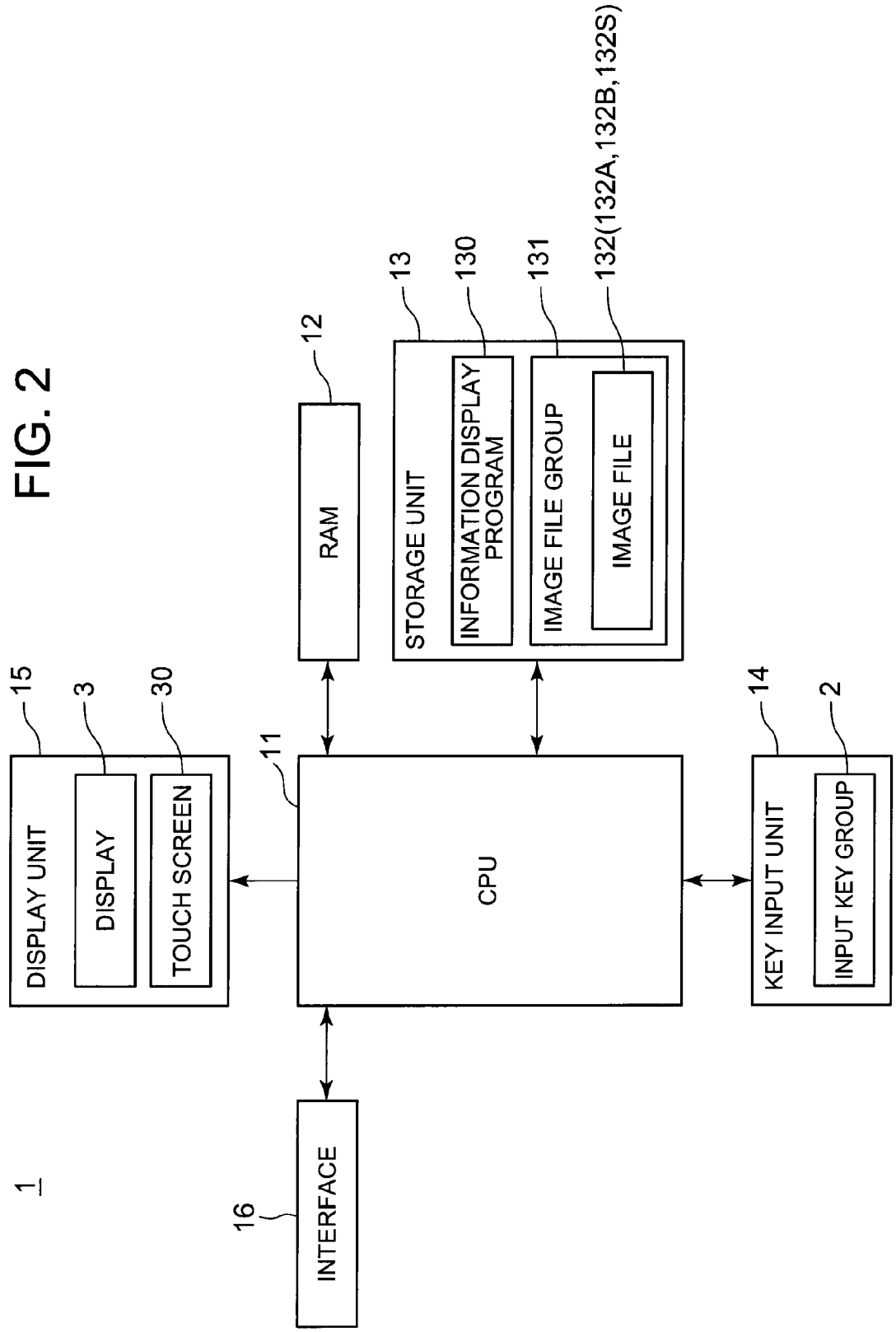

FIG. 3

| | FILE NAME | IMAGE DATA | X COORDINATE | Y COORDINATE | TIME T | DISPLAY MODE SETTING DATA |
|---|---|---|---|---|---|---|
| 132 (132B) | basketball.g3p | IMAGE A | 2.1 | 3.8 | 0.19 | ■ PICTURE GRAPH MODE  FULL-SCREEN  X:0~8  Y:0~0.55  SPLIT SCREEN  X:  Y:  AXIS:OFF  SCALE:OFF  LABEL:OFF  SHAPE OF PLOTTED POINT:CROSS  COLOR OF PLOTTED POINT:RED  ■ GRAPH MODE  ■ GEOMETRIC MODE |
| | | | 2.5 | 4.5 | 0.40 | |
| | | | 2.9 | 5 | 0.58 | |
| | | | 3.3 | 5.35 | 0.79 | |
| | | | 3.6 | 5.45 | 0.98 | |
| | | | 3.9 | 5.4 | 1.20 | |
| | | | ⋮ | ⋮ | ⋮ | |
| 132 (132B, 132S) | wheel.g3p | IMAGE B | -12.7 | 1.6 | 0 | ■ PICTURE GRAPH MODE  FULL-SCREEN  X:-100~100  Y:-50~50  SPLIT SCREEN (138S)  X:  Y:  AXIS:OFF  SCALE:OFF  LABEL:OFF  SHAPE OF PLOTTED POINT:CROSS  COLOR OF PLOTTED POINT:MAGENTA  ■ GRAPH MODE  ■ GEOMETRIC MODE |
| | | | -42.9 | 24.2 | 10 | |
| | | | -44.4 | 72.9 | 20 | |
| | | | -27.0 | 92.1 | 30 | |
| | | | 9.5 | 99.0 | 40 | |
| | | | 30.2 | 89.9 | 50 | |
| | | | 46 | 30.5 | 60 | |
| | | | ⋮ | ⋮ | ⋮ | |
| 132 (132A) | basketball2.g3p | IMAGE 1 | 2.1 | 3.8 | 0.19 | ■ PICTURE GRAPH MODE  FULL-SCREEN  X:0~8  Y:0~0.55  SPLIT SCREEN  X:  Y:  AXIS:OFF  SCALE:OFF  LABEL:OFF  SHAPE OF PLOTTED POINT:CROSS  COLOR OF PLOTTED POINT:RED  ■ GRAPH MODE  ■ GEOMETRIC MODE |
| | | IMAGE 2 | 2.5 | 4.5 | 0.40 | |
| | | IMAGE 3 | 2.9 | 5 | 0.58 | |
| | | IMAGE 4 | 3.3 | 5.35 | 0.79 | |
| | | IMAGE 5 | 3.6 | 5.45 | 0.98 | |
| | | IMAGE 6 | 3.9 | 5.4 | 1.20 | |
| | | | ⋮ | ⋮ | ⋮ | |
| | ⋮ | | ⋮ | ⋮ | ⋮ | ⋮ |

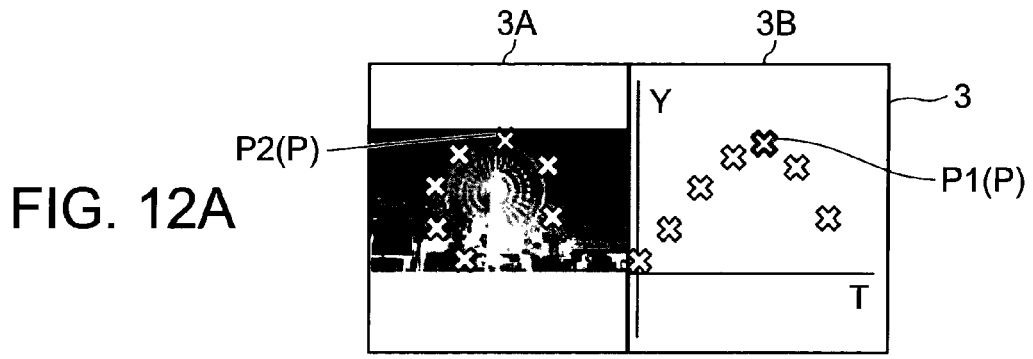
FIG. 12A
FIG. 12B
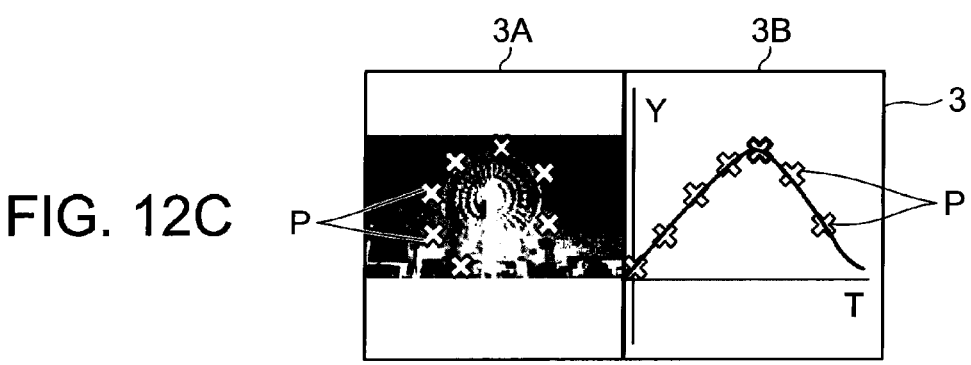
FIG. 12C
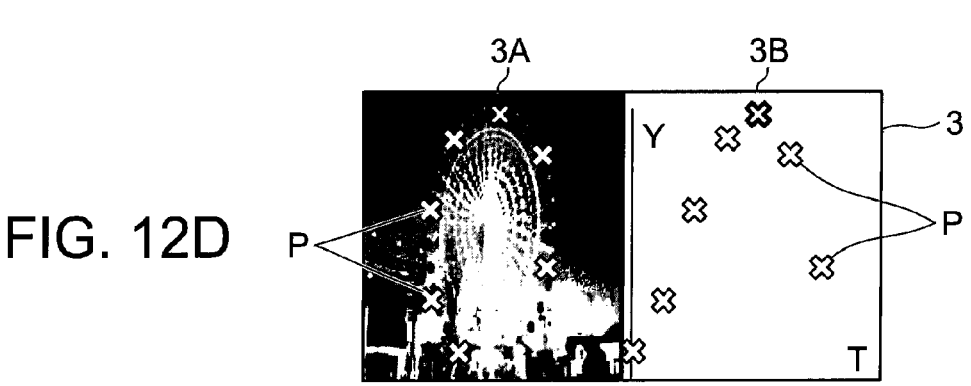
FIG. 12D

DISPLAY APPARATUS AND COMPUTER READABLE MEDIUM

CROSS-REFERENCE TO RELATED APPLICATIONS

This application is based upon and claims the benefit of priority under 35 USC 119 of Japanese Patent Application No. 2010-094613 filed on Apr. 16, 2010, the entire disclosure of which, including the description, claims, drawings, and abstract, is incorporated herein by reference.

BACKGROUND OF THE INVENTION

1. Field of the Invention

The present invention relates to a display apparatus and a computer readable medium.

2. Description of Related Art

Conventionally, a display apparatus for displaying plotted points or approximate graphs has been capable of splitting a display area into two areas, so that plotted points/approximate graphs in different coordinate systems such as an XY coordinate system and an XZ coordinate system can be displayed in each area respectively (e.g., refer to the Japanese Patent Application Laid-Open Publication No. 2003-281102). According to such a display apparatus, it becomes possible to analyze distribution of the plotted points of a three dimensional space simultaneously in a plurality of planes of coordinates and therefore to increase learning effect of a user.

However, by the display apparatus of the above-mentioned patent document, distribution of the plotted points in the three dimensional space and events in the real life cannot be correlated and therefore learning effect of the user is low.

SUMMARY OF THE INVENTION

The objects of the present invention include providing a display apparatus and a computer readable medium which can increase learning effect more than conventional ones.

According to a first aspect of the present invention, there is provided a display apparatus including:

a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis;

a memory which stores at least one image file including image data, coordinate range data indicating a range of the first coordinate system set to overlap an image of the image data, and coordinate value table data indicating coordinate values in the first coordinate system of each of analysis target points previously set in the image; and a processor which performs processing of:

image file specifying processing which specifies any one of image files stored in the memory as a specified image file based on a user operation;

display processing which (i) reads out from the specified image file, the image data as specified image data, the coordinate range data as specified coordinate range data, and the coordinate value table data as specified coordinate value table data, (ii) controls a display of at least a part of an image part among an image of the specified image data, in the first display area of the display section, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system, wherein the coordinate value table data correlates a coordinate value of the third coordinate axis with the coordinate values in the first coordinate system, and wherein the display processing sets the second coordinate system in the second display area based on the specified coordinate value table data, and controls a display of plotted points at each position indicated by the specified coordinate value table data among each coordinate position of the second coordinate system.

According to a second aspect of the present invention, there is provided a computer readable medium which stores a program including a series of instructions to make a computer execute processing, the computer including: a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis; and a memory which stores at least one image file including image data, coordinate range data indicating a range of the first coordinate system set to overlap an image of the image data, and coordinate value table data indicating coordinate values in the first coordinate system of each of analysis target points previously set in the image, and the processing including:

an image file specifying instruction which specifies any one of image files stored in the memory as a specified image file based on a user operation;

a display instruction which (i) reads out from the specified image file, the image data as specified image data, the coordinate range data as specified coordinate range data, and the coordinate value table data as specified coordinate value table data, (ii) controls a display of at least a part of an image part among an image of the specified image data, in the first display area of the display section, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system, wherein the coordinate value table data correlates a coordinate value of the third coordinate axis with the coordinate values in the first coordinate system, and wherein the display instruction sets the second coordinate system in the second display area based on the specified coordinate value table data, and controls a display of plotted points at each position indicated by the specified coordinate value table data among each coordinate position of the second coordinate system.

According to a third aspect of the present invention, there is provided a display apparatus including:

a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis;

an image file storage section which stores at least one image file including image data, coordinate range data indicating a range of the first coordinate system set to overlap an image of the image data, and coordinate value table data indicating coordinate values in the first coordinate system of each of analysis target points previously set in the image;

an image file specifying section which specifies any one of image files stored in the image file storage section as a specified image file based on a user operation;

a display control section which (i) reads out from the specified image file, the image data as specified image data, the coordinate range data as specified coordinate range data, and the coordinate value table data as specified coordinate value table data, (ii) controls a display of at least a part of an image part among an image of the specified image data, in the first display area, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system, wherein the coordinate value table data correlates a coordinate value of the third coordinate axis with the coordinate values in the first coordinate system, and wherein the display control section sets the second coordinate system in the second display area based on the specified coordinate value table data, and controls a display of plotted points at each position indicated by the specified coordinate value table data among each coordinate position of the second coordinate system.

BRIEF DESCRIPTION OF THE DRAWINGS

FIG. 2 is a block diagram showing a functional configuration of the alpha calculator;

FIG. 3 is a view showing data configuration of an image file;

FIGS. 12A to 12D are views showing a display content of a display;

DESCRIPTION OF THE PREFERRED EMBODIMENTS

Hereinafter, an example of an embodiment of the present invention will be explained in detail with reference to attached drawings. However, scope of the invention is not limited to the displayed example.

[1.1 External View]

Figure 1:
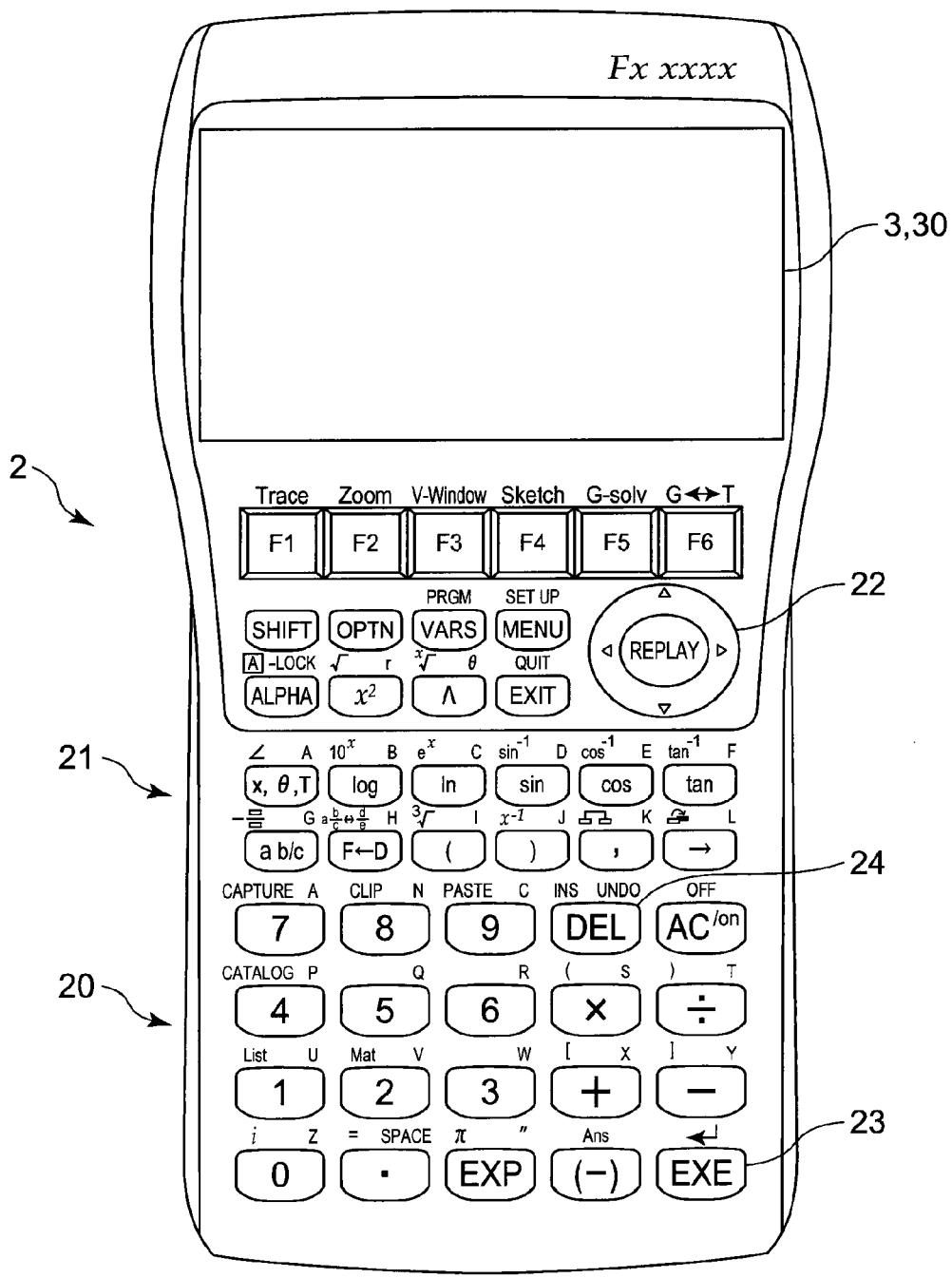
FIG. 1 is a plan view showing a schematic configuration of an alpha calculator.

FIG. 1 is a plan view showing a schematic configuration of an alpha calculator 1 to which an electric device according to the present invention is applied.

As shown in the figure, the alpha calculator 1 includes an input key group 2 having various types of keys, and a display 3.

The input key group 2 is a key group for receiving an input operation of a composition element of a mathematical formula such as a numerical value or a symbol of calculation or for receiving an instruction operation of various types of processing by a user, and includes a plurality of keys each of which being allotted with a unique function. A unique function is allocated to each of the keys. In the present embodiment, the input key group 2 includes a numerical keypad 20, a calculation symbol key 21, a cursor key 22, an EXE key 23, a delete key 24, and the like.

Among them, the numerical keypad 20 is for receiving input operation of a numerical value, and the calculation symbol key 21 is for receiving an input operation of various calculation symbols such as a symbol of four arithmetic calculations, brackets, a vinculum of a fraction, a root sign ($\sqrt{}$), a symbol of logarithm, a constant ("π" of circular constant, "c" of light speed, and the like), and a symbol of trigonometric function.

The cursor key 22 is a key pressed when a cursor indicating a position of an editing target or a position of a selection target is moved in the display 3 to a predetermined direction, or the like. The cursor key 22 is configured to be able to input operations in four directions, up, down, right, and left in the present embodiment.

The EXE key 23 is a key for receiving an input operation of execution instruction of a processing or instruction of decision, and is configured to function as an instruction key for execution of, for example, calculation processing after a formula is inputted. The delete key 24 is a key for receiving a deletion operation of a numerical value or a calculation symbol displayed on the display 3.

The display 3 includes a liquid crystal display (LCD), an electric luminescent display (ELD), or the like, and displays various types of data which is necessary when using the alpha calculator 1 other than a character, a code, a formula, and a result of calculation, in response to operation of the input key group 2 or the like. Here, the display 3 of the present embodiment can display a plurality of layers in a laminated manner. Moreover, the display 3 has a left side display area 3A on the left side and a right side display area 3B on the right side of a display screen which is split into half, so that it becomes possible to switch the display screen between a split display condition where the display screen is split into the left side display area 3A and the right side display area 3B, as shown in later-described FIG. 11B or the like, and a full-screen display condition where display is carried out without splitting the display screen. In addition, the display 3 can set an XY orthogonal coordinate system to be displayed on the left side display area 3A and a TX orthogonal coordinate system or a TY orthogonal coordinate system to be displayed on the right side display area 3B, when being displayed in the split display condition. Further, a touch screen 30 is provided on the whole display screen of the display 3 in an integrated manner.

[1.2 Function Configuration]

Subsequently, a function configuration of the alpha calculator 1 will be explained.

FIG. 2 is a block diagram showing a function configuration of the alpha calculator 1.

As shown in the figure, the alpha calculator 1 includes a key input unit 14, a display unit 15, an interface 16, a random access memory (RAM) 12, a storage unit 13, and a central processing unit (CPU) 11.

The key input unit 14 has the above-mentioned input key group 2 and outputs an operation signal which corresponds to a pressed key to the CPU 11.

The display unit 15 has the above-mentioned display 3 and displays various pieces of information on the display 3 according to a display signal from the CPU 11. Moreover, the display unit 15 has the touch screen 30 provided in an integrated manner with the display 3 to output touch position information of an input pen on the display screen to the CPU 11.

The interface 16 is a connection terminal for connecting the display apparatus to an external device (not shown). In the present embodiment, the interface 16 can read a later-described image file 132 or the like from an external device via a USB cable or the like, so that the information may be stored in the storage unit 13. Here, the interface 16 may read data from a recording medium such as a card medium.

The RAM 12 is a volatile memory for temporarily storing information, and has a plurality of work areas for storing various types of programs to be executed, data regarding the various types of programs, or the like.

The storage 13 is a non-volatile memory including a read only memory (ROM) or the like, and stores various programs and various data. Specifically, the storage unit 13 stores an information display program 130 as a program according to the present invention and an image file group 131.

The information display program 130 is a program for causing the CPU 11 to execute later-described information display processing (refer to FIG. 5).

The image file group 131 includes a plurality of image files 132, and more specifically includes at least one image file 132 having a plurality of pieces of image data 133 (hereinafter referred to as a plural image file 132A) and at least one piece of image file 132 having only one image data 133 (hereinafter referred to as a single image file 132B) respectively, as shown in FIG. 3. Each of the image files 132 has the image data 133, a display mode setting data 134, and a coordinate value table data 135 which are correlated with each other. Here, for simplification of the drawing, an image of the image data 133 is not shown in FIG. 3.

Figure 4A:
FIGS. 4A and 4B are views showing an image of image data.
Figure 4B:
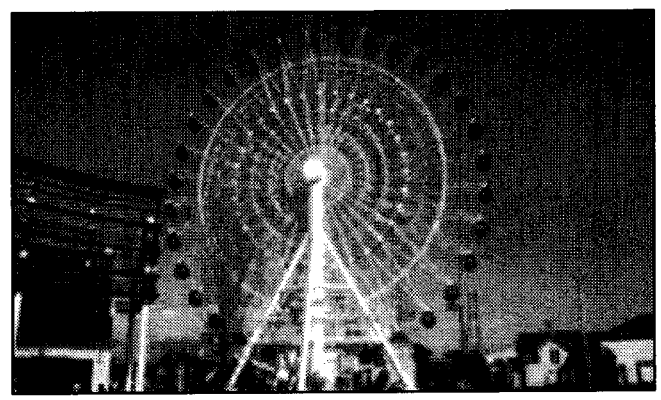

The image data 133 is data regarding an image which can be displayed in an overlapping manner on the coordinate system and shows a predetermined shape which can be approximated by a graph (e.g., a parabola, a straight line, a circle, a polygon, or the like). More specifically, the image of the image data 133 in the single image file 132B is an image obtained by compositing serial radiography of a moving object such as a ball, or an image obtained by taking a group of objects which carry out same movement such as gondolas of a Ferris wheel, as shown in, for example, FIG. 4A or FIG. 4B, and shows a predetermined shape by a mass of object positions (analysis target points) in each image. On the other hand, the image of the image data 133 of the plural image file 132A includes, for example, a plurality of images taken by serial radiography of a moving object and a mass of object positions (points of analysis object) in each image shows a predetermined shape. However, an image which is different from an actual event such as a drawn image may be used as the image data 133. Moreover, the predetermined shape which can be approximated by a graph is not limited to a parabola, a straight line, a circle, and a polygon and may take other shapes.

Further, the display mode setting data 134 is data indicating a display mode of the display 3 and indicates a display mode for each mode by which the image can be displayed, more specifically, indicates each of a picture graph mode, a graph mode, and a geometric mode. Here, the picture graph mode is a mode in which plotted points are displayed so as to be superimposed on an image. In the graph mode, a graph is displayed so as to be superimposed on a single image. In the geometric mode, a figure drawn by a user is displayed so as to be superimposed on an image.

Further, as information regarding the display mode of an image in the picture graph mode and the graph mode, the display mode setting data 134 includes: data indicating a range of an XY coordinate system (an upper limit value and a lower limit value of the XY axis) which is set on the whole of the image of the image data 133 in an overlapping manner (hereinafter referred to as whole image corresponding coordinate range data 138); data indicating a range of the XY coordinate system which is to be set in an overlapping manner in an image part of the display target in a case where the image is reduced or trimmed to be displayed in the left side display area 3A of the display 3 (hereinafter referred to as reduced image corresponding coordinate range data 139); and data indicating an interval of a scale of each coordinate axis. However, the reduced image corresponding coordinate range data 139 may not be included in the display mode setting data 134.

Moreover, as information regarding the display mode in the picture graph mode and the graph mode, the display mode setting data 134 includes: setting information regarding a color or shape of a plotted point P (refer to FIGS. 11A to 11D) displayed in a later-described information display processing (refer to FIG. 5), other than setting information regarding whether or not a coordinate axis is displayed (refer to the article on the "axis"), whether or not a scale is displayed (refer to the article on the "scale"), whether or not a coordinate label (a coordinate axis name of the XY axis and "0" of a origin position) is displayed (refer to the article on the "label") and the like.

In addition, the coordinate value table data 135 indicates coordinate values of each of plotted points P in XYT coordinate systems. Here, in the present embodiment, the coordinate value table data 135 includes at least a coordinate value regarding a T axis (time axis) in advance. The coordinate value regarding the T axis may be set by the user or may be set in advance when the image file 132 is created by an external device. On the other hand, a coordinate value of the XY axis may be included in the coordinate value table data 135 in advance or may be newly included by later-described single plot mode processing (refer to FIG. 7) or plural plot mode processing (refer to FIG. 6). The XY coordinate values of each plotted point P indicates coordinate values in the XY coordinate system regarding an analysis target point which is set in advance by a user in the image of the image data 133 (for example, a ball in FIG. 4A, a gondola in FIG. 4B, or the like).

Here, the coordinate value table data 135 in the plural image file 132A correlates one coordinate value with each piece of the image data 133, so that the number of the data fields in the coordinate value table data 135, that is, the number of the coordinate values which can be stored, is equal to the number of pieces of the image data 133 in the image file 132. On the other hand, the coordinate value table data 135 in the single image file 132B correlates a plurality of coordinate values with one piece of image data 133, so that the number of data fields in the coordinate value table data 135 is the number previously set by a user or set when the file was created (for example, number of composition in a composite file). Here, each coordinate value regarding the T axis indicates time elapsed since a base time which was set when each piece of the image data 133 was taken, in the plural image file 132A. Moreover, in the single image file 132B, the coordinate value indicates elapsed time since abase time in a case where any of an analysis target point in the image data 133 is taken is set as the base time. That is, in the plural image file 132A having a file name such as "basketball2.g3p", for example, each piece of the image data 133 is a photograph which was continuously taken, and a value of the T axis in the coordinate value table data 135 is a record of an elapsed time when each of the images was photographed. Moreover, in the single image file 132B having a file name of "basketball.g3p", the one piece of the image data 133 is, for example, a composite image leaving a trajectory of variable points of continuously taken photographs, and the value of the T axis in the coordinate value table data 135 is a record of time elapsed when each variable point was photographed.

The CPU 11 centrally controls each section of the alpha calculator 1. Specifically, the CPU 11 expands a system program stored in the storage unit 13 and a program specified among various application programs on the RAM 12 to execute various types of processing in a cooperative manner with the program expanded on the RAM 12.

[1.3 Operation of alpha calculator]

Subsequently, operation of the alpha calculator 1 will be explained.

Figure 5:
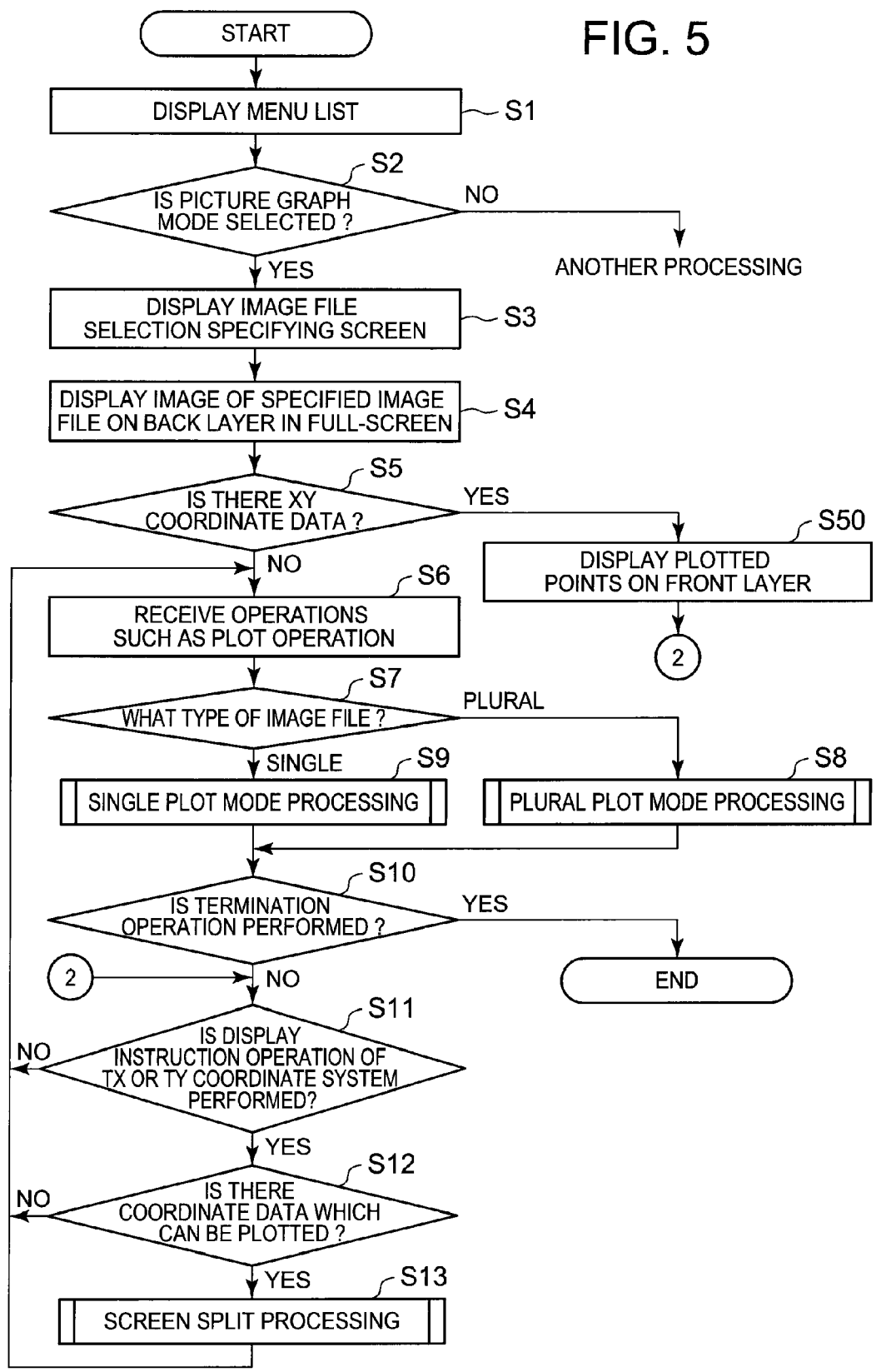
FIG. 5 is a flowchart showing a flow of information display processing.

FIG. 5 is a flowchart for explaining operation of information display processing. Here, the information display processing is executed by the following procedure: When an execution instruction of information display processing is inputted by a user via the touch screen 30 or the key input unit 14, the information display program 130 is read out from the storage unit 13 and is expanded on the RAM 12, and as a result thereof, the information display processing is executed by cooperation of the information display program 130 and the CPU 11.

As shown in the figure, in the information display processing, the CPU 11 first causes the display 3 to display a selection menu screen of various modes (Step S1), then it is judged whether or not a selection operation of picture graph mode is carried out (Step S2), and if it is judged that the selection operation is not carried out (Step S2; No), the processing proceeds to another processing.

Moreover, in a case where it is judged that the selection operation of the picture graph mode is carried out in Step S2 (Step S2; Yes), the CPU 11 causes a selection specifying screen of the image file 132 to be displayed on the display 3 to allow the user to specify any of the image files 132 of the image file group 131 (Step S3). Here, in the Step S3 of the present embodiment, the user specifies the image file 132 via the input key group 2. However, the specifying may be carried out via the touch screen 30.

Next, the CPU 11 reads out the image data 133, a whole image corresponding coordinate range data 138, and the coordinate value table data 135 in the image file 132 specified in Step S3 (hereinafter referred to as a specified image file 132S), as a specified image data 133S, a specified whole image corresponding coordinate range data 138S, and a specified coordinate value table data 135S and at the same time causes the display 3 to be in a full-screen display condition so that an image of the specified image data 133S is displayed in the full-screen on a back layer of the display 3 (Step S4). Here, in a case where the specified image file 132S is a plural image file 132A, the CPU 11 specifies the first or last piece of image data 133 as the specified image data 133S in the Step S4.

Next, the CPU 11 judges whether or not there is information of an XY coordinate value included in the specified coordinate value table data 135S (Step S5). If it is judged that the information is included (Step S5; Yes), an XY coordinate system within a range indicated by the specified whole image corresponding coordinate range data 138S is set on a front layer of the display screen of the display 3 and plotted points P are displayed in each of positions indicated by the specified coordinate value table data 135S among each coordinate position of the XY coordinate system (Step S50). Then, the processing proceeds to later-described Step S11.

Moreover, if it is judged in Step S5 that the XY coordinate value information is not included (Step S5; No), the CPU 11 judges the type of the specified image file 132S (Step S7). Here, in Step S7, the CPU 11 judges whether the specified image file 132S is the plural image file 132A or the single image file 132B.

If it is judged in the Step S7 that the specified image file 132S is the plural image file 132A (Step S7; Plural), the CPU 11 carries out a plural image plot mode processing (Step S8).

Figure 6:
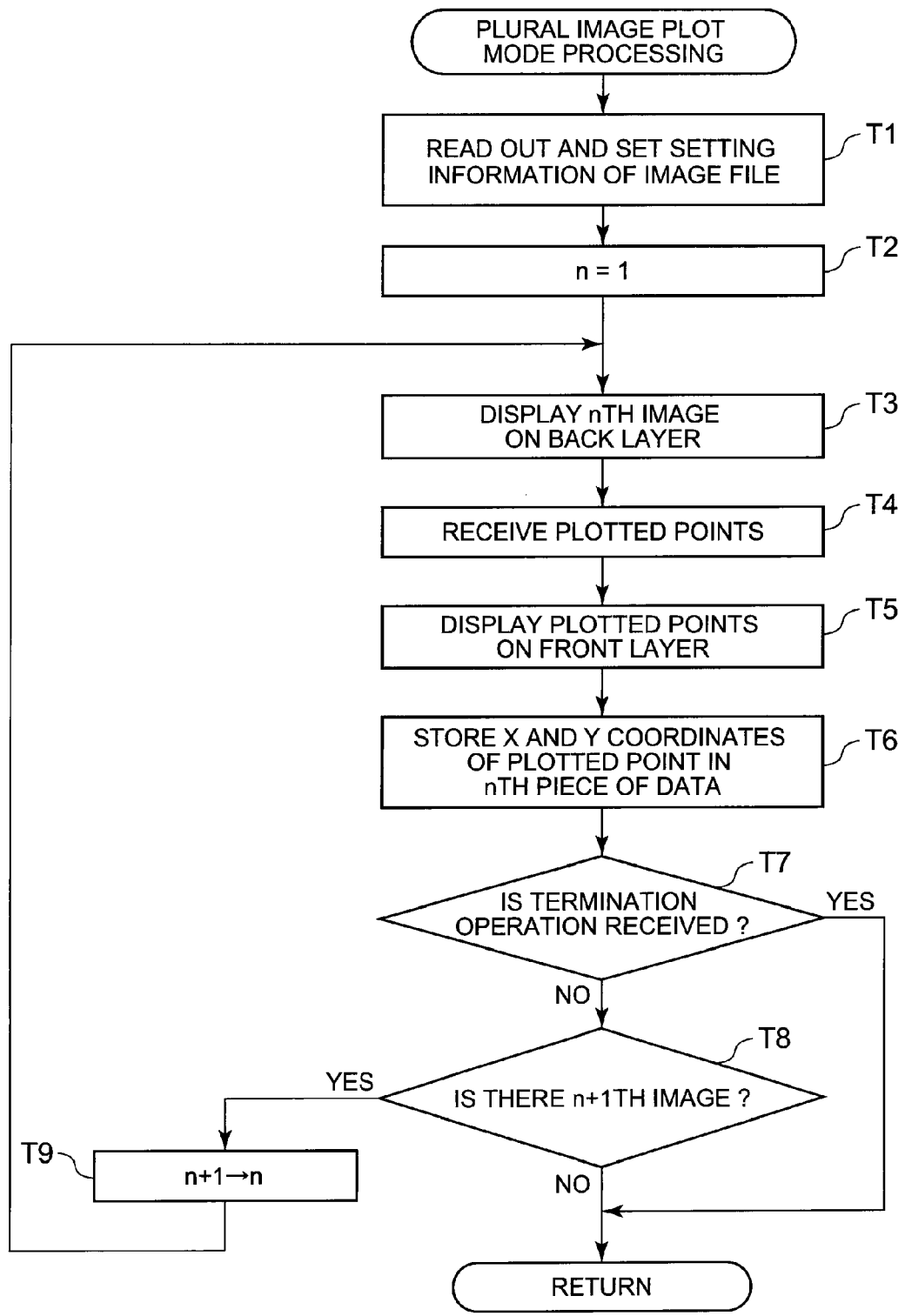
FIG. 6 is a flowchart showing a flow of plural image plot mode processing.

Specifically, as shown in FIG. 6 in the plural image plot mode processing, the CPU 11 first sets an XY axis in the front layer of the display screen of the display 3 and an XY coordinate system determined by the set coordinate axis, as shown in FIG. 6 (Step T1) on the basis of the display mode setting data 134 in the specified image file 132S. More specifically, the CPU 11 reads out a setting range of the XY coordinate system from the specified whole image corresponding coordinate range data 138S of the display mode setting data 134 and sets the XY coordinate system within the setting range in the display area of the image in the front layer. Here, in a case where the setting information for displaying the coordinate axis is included in the display mode setting data 134, the CPU 11 causes the XY axis to be displayed in the front layer.

Next, the CPU 11 sets "1" as a value of a variable "n" (Step T2), and causes an image of the "n"$^{th}$ image data 133 of the specified image file 132S to be displayed on the display 3 as the back layer of the XY coordinate system (Step T3). Here, in a case where plotted points P are displayed on the front layer by the later-described Step T5, the CPU 11 causes each plotted point P to be displayed and maintains the condition while causing the image to be displayed as the back layer in the Step T3.

Next, the CPU 11 allows the user to carry out a plot operation regarding a desired analysis target point in the image in a condition where the image of the image data 133 is displayed on the display screen (Step T4), and causes the plotted point P to be displayed on a target position of the plot operation on the front layer in response to the plot operation (Step T5). Here, in the Step T4 of the present embodiment, the user carries out the plot operation via the touch screen 30. However, the user may carry out the operation via the cursor key 22 or the EXE key 23. Moreover, the CPU 11 sets the color and the shape of the plotted point P on the basis of the display mode setting data 134 of the specified image file 132S in the Step T5. Further, if the plotted point P is already displayed at the point of time of the Step T5, the CPU 11, while keeping the plotted point P being displayed, causes a new plotted point P to be displayed.

Next, the CPU 11 correlates the coordinate value of the plotted point P in the XY coordinate system as the "n"$^{th}$ coordinate value with the coordinate value of the T axis and stores the value in the specified coordinate value table data 135S (Step T6) and subsequently judges whether or not a termination operation of the plural image plot mode processing is carried out by the user (Step T7).

If it is judged that the termination operation is not carried out in the Step T7 (Step T7; No), the CPU 11 judges whether or not there exists an "n+1"$^{th}$ piece of image data 133 in the specified image file 132S (Step T8).

If it is judged in the Step T8 that the "n+1"$^{th}$ piece of image data 133 exists (Step T8; Yes), the CPU 11 increases the variant "n" by "1" to reset the value (Step T9) and then the processing proceeds to the above-mentioned Step T3.

Subsequently, the above-mentioned processing of Step T3 to Step T9 is repeatedly carried out to sequentially switch the image data 133, which is to be display-controlled, in the specified image file 132S, and the plot operation is carried out for each image. As a result thereof, plotted points P are displayed at target positions of each plot operation and as a mass of the plotted points P, a trajectory of the analysis target points is displayed.

Then, if it is judged that the termination operation is carried out in the above-mentioned Step T7 (Step T7; Yes), or if it is judged that there does not exist the "n+1"$^{th}$ piece of image data 133 in the above-mentioned Step T8 (Step T8; No), the CPU 11 causes the image of the specified image data 133S to be displayed in the back layer of the display screen of the display 3 and terminates the plural image plot mode processing.

By the above-mentioned plural image plot mode processing, an image of the specified image data 133S is full-screen displayed, at the same time the XY coordinate system in a range indicated by the specified whole image corresponding coordinate range data 138S is set in the front layer of the display screen of the display 3, and plotted points P are displayed in each of positions indicated by the specified coordinate value table data 135S among each of coordinate positions of the XY coordinate system.

Then, when the plural image plot mode processing is terminated, as shown in FIG. 5, CPU 11 proceeds to the later described Step S10.

Moreover, if it is judged in the above-mentioned Step S7 that the specified image file 132S is the single image file 132B (Step S7; Single), the CPU 11 carries out the single image plot mode processing (Step S9).

Figure 7:
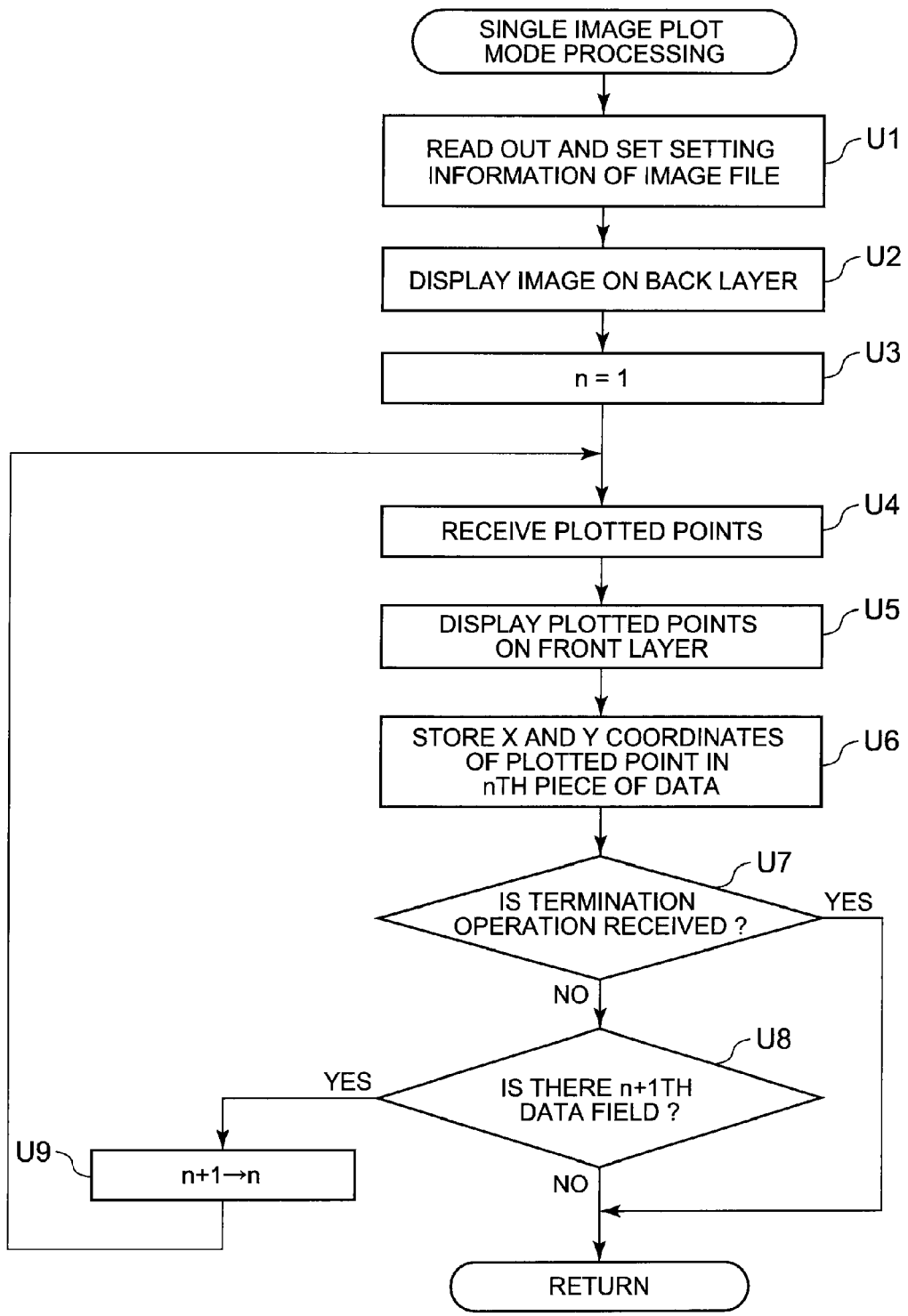
FIG. 7 is a flowchart showing a flow of single image plot mode processing.

Specifically, as shown in FIG. 7, the CPU 11 in the single image plot mode processing first sets the XY axis in the front layer of the display screen of the display 3 on the basis of the display mode setting data 134 of the specified image file 132S and the XY coordinate system determined by the axis (Step U1). More specifically, the CPU 11 reads out a setting range of the XY coordinate system from the specified whole image corresponding coordinate range data 138S of the display mode setting data 134 and sets the XY coordinate system within the setting range in the display area of the image in the front layer. Here, in a case where the setting information for displaying the coordinate axis is included in the display mode setting data 134, the CPU 11 causes the XY axis to be displayed in the front layer.

Next, the CPU 11 causes the image of the specified image data 133S to be displayed on the display 3 as the back layer of the XY coordinate system (Step U2) and at the same time sets the value of the variant "n" as "1" (Step U3).

Next, the CPU 11 allows the user to carry out a plot operation regarding a desired analysis target point in the image in a condition where the image of the specified image data 133S is displayed on the display screen (Step U4), and causes the plotted point P to be displayed at a target position of the plot operation in the front layer in response to the plot operation (Step U5). Here, in the Step U4 of the present embodiment, the user carries out the plot operation via the touch screen 30. However, the user may carry out the operation via the cursor key 22 or the EXE key 23. Moreover, the CPU 11 sets the color and the shape of the plotted point P on the basis of the display mode setting data 134 of the specified image file 132S in Step U5. Further, if the plotted point P is already displayed at the point of time of the Step U5, the CPU 11, while keeping the plotted point P being displayed, causes a new plotted point P to be displayed.

Next, the CPU 11 correlates the coordinate value of the plotted point P in the XY coordinate system as the "n"$^{th}$ coordinate value with the coordinate value of the T axis and stores the value in the specified coordinate value table data 135S (Step T6) and subsequently judges whether or not termination operation of the single image plot mode processing is carried out by the user (Step U7).

If it is judged that the termination operation is not carried out in Step U7 (Step U7; No), the CPU 11 judges whether or not there exists an "n+1"$^{th}$ image data column in the coordinate value table data 135 of the specified image file 132S (Step U8).

If it is judged in the Step U8 that there exists the "n+1"$^{th}$ image data column (Step U8; Yes), the CPU 11 increases the variant "n" by "1" to reset the value (Step U9) and then the processing proceeds to the above-mentioned Step U4.

Subsequently, the above-mentioned processing of Step U4 to Step U9 is repeatedly carried out so that the plot operation is sequentially carried out for the image in a condition where the image of the specified image data 133S of the specified image file 132S is being displayed. As a result thereof, plotted points P of the target positions of each plot operation are displayed and a trajectory of analysis target points as a mass of the plotted points P is displayed.

Then, if it is judged that the termination operation is carried out in the above-mentioned Step U7 (Step U7; Yes), or if it is judged that there does not exist the "n+1"$^{th}$ data column in the coordinate value table data 135 of the specified image file 132S in the above-mentioned Step U8 (Step U8; No), the CPU 11 terminates the single image plot mode processing.

By the above-mentioned single image plot mode processing, an image of the specified image data 133S is full-screen displayed, and at the same time the XY coordinate system within a range indicated by the specified whole image corresponding coordinate range data 138S is set in the front layer of the display screen of the display 3, and the plotted points P are displayed at each of positions indicated by the specified coordinate value table data 135S among each of coordinate positions of the XY coordinate system.

Then, when the single image plot mode processing is terminated, as shown in FIG. 5, the CPU 11 judges whether or not the termination operation is carried out by the user (Step S10) and if it is judged that the operation is carried out (Step S10; Yes), the CPU 11 terminates the information display processing.

Moreover, if it is judged that the termination operation is not carried out in the Step S10 (Step S10; No), the CPU 11 judges whether or not a display instruction operation of plotted points P in the TX coordinate system or the TY coordinate system is carried out (Step S11) and if it is judged that the operation is not carried out (Step S11; No), the CPU 11 proceeds to the above-mentioned Step S6.

In addition, if it is judged in the Step S11 that the display instruction operation of the plotted points P in the TX coordinate system or the TY coordinate system is carried out (Step S11; Yes), the CPU 11 judges whether or not there exists data of a coordinate value, which can be plotted in the instructed coordinate system, in the specified coordinate value table data 135S (Step S12) and if it is judged that there does not exist such data (Step S12; No), the CPU 11 proceeds to the above-mentioned Step S6.

Further, if it is judged in the Step S12 that there exists the data of the coordinate value (Step S12; Yes), the CPU 11 carries out screen split processing (Step S13) and proceeds to the above-mentioned Step S6.

Figure 8:
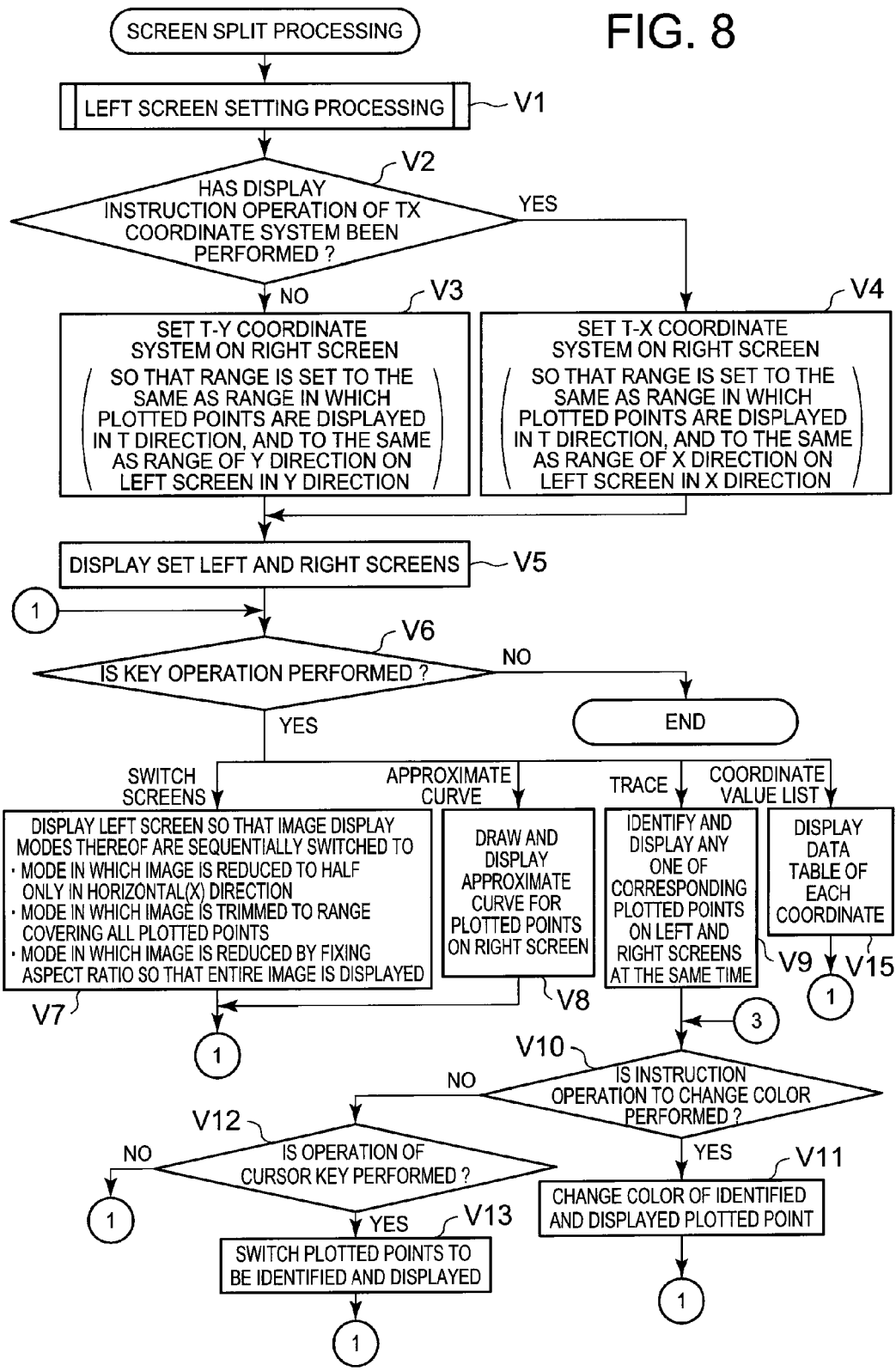
FIG. 8 is a flowchart showing a flow of split processing.

Here, in the screen split processing, the CPU 11 first carries out left screen setting processing as shown in FIG. 8 (Step V1).

Figure 9:
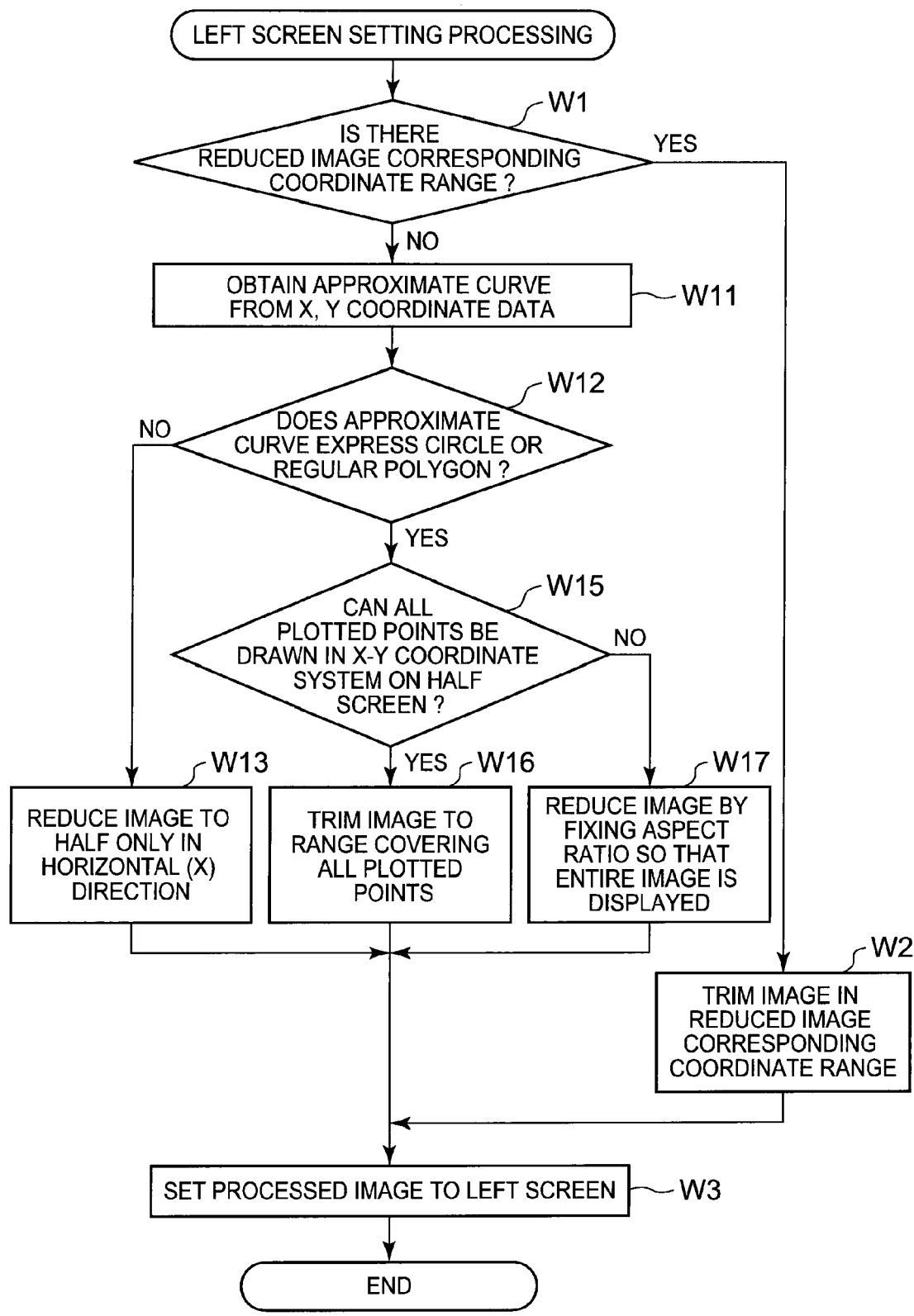
FIG. 9 is a flowchart showing a flow of left screen setting processing.

Specifically, as shown in FIG. 9, the CPU 11 first judges whether or not reduced image corresponding coordinate range data 139 is included in the specified image file 132S in the left screen setting processing (Step W1).

If it is judged in Step W1 that the reduced image corresponding coordinate range data 139 is included (Step W1; Yes), the CPU 11 trims an image of the specified image data 133S, which is overlapped on the XY coordinate system by the whole image corresponding coordinate range data 138, to leave only an image part of the range corresponding to the reduced image corresponding coordinate range data 139 (Step W2).

Then, the CPU 11 sets the processed image part as a display content of the back layer of the left side display area 3A of the display 3 (Step W3) and terminates the left screen setting processing.

Moreover, if it is judged that the reduced image corresponding coordinate range data 139 is not included in the specified image file 132S in the above-mentioned Step W1 (Step W1; No), the CPU 11 reads out coordinate values of plotted points P in the XY coordinate system from the specified coordinate value table data 135S and calculates an approximate curve for the mass of the plotted points P (Step W11). Here, at this time, the CPU 11 may overlap the approximate curve on the mass of the plotted points P to display the curve on the display 3. Moreover, a type of the approximate curve to be calculated is automatically detected by the CPU 11 by use of a heretofore known method on the basis of a distribution condition of the plotted points P. Alternatively, a type of the approximate curve may be inputted by user operation or the approximate curve itself may be inputted.

Next, the CPU 11 judges whether or not the calculated or inputted approximate curve has a circular or regular polygonal shape (Step W12) and if it is judged that the curve does not take such a shape (Step W12; No), the CPU 11 reduces the image of the specified image data 133S to a predetermined size having a different aspect ratio (hereinafter referred to as an aspect ratio changed reduced size) (Step W13) and proceeds to the above-mentioned Step W3. Here, in Step W13, the CPU 11 uses a size of the image in the full-screen display condition which is reduced by a predetermined amount in only horizontal direction (specifically, a size reduced to less than half of the original size) as the aspect ratio changed reduced size so that the whole of the image of the specified image data 133S can be displayed in the left side display area 3A. However, in a case where the display screen of the display 3 is split into half in up and down, the CPU 11 may use a display size of the image which is reduced to half of the original size in up and down directions as the aspect ratio changed reduced size in the Step W13.

Moreover, if it is judged in the above-mentioned Step W12 that the approximate curve has a circular or regular polygonal shape (Step W12; Yes), the CPU 11 judges whether or not all the plotted points P (analysis target points in the image) in the XY coordinate system which is overlapped on the image can be drawn in the left side display area 3A in a case where the image of the specified image data 133S is displayed in the left side display area 3A without being reduced, in other words, whether or not all the plotted points P in the XY coordinate system can be drawn in the left side display area 3A by trimming the image of the specified image data 133S and the XY coordinate system overlapped on the image (Step W15).

If it is judged in the Step W15 that all the plotted points P can be drawn in the left side display area 3A (Step W15; Yes), the CPU 11 trims the image of the specified image data 133S to a predetermined size (hereinafter referred to as a trimming size) (Step W16) and subsequently proceeds to the above-mentioned Step W3. Here, in the Step W16, the CPU 11 uses a size by which the image of the specified image data 133S is trimmed off only to an image part including all the plotted points (analysis target points) as the trimming size.

Moreover, if it is judged in the Step W15 that all the plotted points P cannot be drawn in the left side display area 3A (W15; No), the CPU 11 reduces the image of the specified image data 133S to a predetermined size having an equal aspect ratio (hereinafter referred to as an aspect ratio fixed reduced size) (Step W17) and subsequently proceeds to the above-mentioned Step W3. Here, in Step W17, the CPU 11 uses a size by which display size of the image of the specified image data 133S in the full-screen display condition is equally reduced in horizontal and vertical directions so that the whole of the image can be displayed in the left side display area 3A (specifically a size which is reduced to equal to or less than half in each direction) as the aspect ratio fixed reduced size.

When the above-mentioned left screen setting processing is terminated, as shown in FIG. 8, the CPU 11 judges whether or not a display instruction operation of the TX coordinate system is carried in the above-mentioned Step S11 (refer to FIG. 5) (Step V2) and if it is judged that the operation is not carried out, that is, it is judged that a display instruction operation of the TY coordinate system is carried out (Step V2; No), the CPU 11 sets the TY coordinate system in the right side display area 3B of the display 3 (Step V3) and subsequently CPU 11 proceeds to a later-described Step V5. More specifically, in Step V3, the CPU 11 sets the T axis to be within a range where each coordinate value indicated by the specified coordinate value table data 135S is included in the right side display area 3B in the T axis direction while in the Y axis direction the CPU 11 sets the range to be the same as the range in the Y axis direction in the left side display area 3A (a range where the upper limit values and the lower limit values respectively match) to set the TY coordinate system in the right side display area 3B.

Moreover, if it is judged that the display instruction operation of the TX coordinate system is carried out in the above-mentioned Step V2 (Step V2; Yes), the CPU 11 sets the TX coordinate system in the right side display area 3B of the display 3 (Step V4). More specifically, in Step V4, the CPU 11 sets the T axis to be within a range where each coordinate value indicated by the specified coordinate value table data 135S is included in the right side display area 3B in the T axis direction while in the X axis direction the CPU 11 sets the range to be the same as the range in the X axis direction in the left side display area 3A (a range where the upper limit values and the lower limit values respectively match) to set the TX coordinate system in the right side display area 3B.

Next, the CPU 11 sets the display 3 in a split display condition and at the same time causes the image of the specified image data 133S and plotted points P to be displayed in the left side display area 3A and plotted points P to be displayed in the right side display area 3B on the basis of the above-mentioned Step V1 and setting contents of Step V3 or V4 (Step V5). More specifically, in the Step V5, the CPU 11 causes at least a part of the image of the specified image data 133S to be displayed in the back layer of the left side display area 3A with the image size set by the Step V1, that is, a size smaller than the display size in the full-screen display condition, and at the same time sets the XY coordinate system having a range set to overlap the image part in the specified whole image corresponding coordinate range data 138S in the front layer of the left side display area 3A. Then, the CPU 11 causes the plotted points P to be displayed at each position which is indicated by the specified coordinate value table data 135S among each coordinate position of the XY coordinate system. Moreover, the CPU 11 causes the plotted points P to be displayed at each of positions which are indicated by the specified coordinate value table data 135S, among each coordinate position of the TX coordinate system or the TY coordinate system in a range set by the Step V3 or V4.

Next, the CPU 11 judges whether or not a key operation is carried out (Step V6) and if it is judged that the operation is not carried out (Step V6; No), the CPU 11 terminates the split processing.

Moreover, in a case where it is judged that the key operation is carried out in Step V6 and switching of the screen is instructed (Step V6; Yes, switching screens), the CPU 11 switches the display size of the image of the specified image data 133S in the left side display area 3A to update the display content of the display 3 (Step V7) and proceeds to the above-mentioned Step V6. Specifically, in the Step V7, the CPU 11 sequentially switches the display size of the image between the above-mentioned aspect ratio changed reduced size, the aspect ratio fixed reduced size, and the trimming size every time an instruction operation for switching the display is carried out. Moreover, at this time, the CPU 11 sets the XY coordinate system in a range having been set to overlap the image part displayed in the left side display area 3A to the front layer of the left side display area 3A and causes the plotted points P to be displayed at each position indicated by the specified coordinate value table data 135S among each of the coordinate positions of the XY coordinate system. Further at this time, the CPU 11 resets the range in the X axis direction or Y axis direction in the right side display area 3B to be the same range as that in the X axis direction or the Y axis direction newly set in the left side display area 3A (a range where the upper limit values and the lower limit values respectively match) and causes the plotted points P to be displayed at each position indicated by the specified coordinate value table data 135S among each of the coordinate positions of the reset TX coordinate system or the TY coordinate system.

Further, in a case where it is judged that the key operation is carried out in the above-mentioned Step V6, and if display of an approximate curve is instructed (Step V6; Yes, approximate curve), the CPU 11 calculates an approximate curve for the mass of the plotted points displayed in the right side display area 3B, causes the approximate curve to overlap the mass of the plotted points P to be displayed in the right side display area 3B (Step V8) and subsequently proceeds to the above-mentioned Step V6.

Further, if it is judged in the above-mentioned Step V6 that the key operation is carried out and trace of the plotted points P is instructed (Step V6; Yes, trace), the CPU 11 selects any of the plotted points P displayed in the right side display area 3B as a selected plotted point P1, detects a plotted point P having a coordinate value which corresponds to that of the selected plotted point P1 among the plotted points displayed in the left side display area 3A as a corresponding plotting point P2, and causes the selected plotted point P1 and the corresponding plotted point P2 to be respectively identified for displaying (Step V9). However, at this time, the CPU 11 may select a plotted point P in the left side display area 3A as the selected plotted point P1 and detect a plotted point P in the right side display area 3B as the corresponding plotted point P2. Here, in the present embodiment, explanation will be given on an assumption that the CPU 11 identifies the plotted points P by blinking them. However, in another embodiment, the plotted points may be identified by another mode. Moreover, a plotted point having a coordinate value which corresponds to that of the selected plotted point P1 among the plotted points P displayed in the left side display area 3A means a plotted point P having a corresponding X coordinate value in a case where the TX coordinate system is set in the right side display area 3B and a plotted point P having a corresponding Y coordinate value in a case where the TY coordinate system is set therein.

Next, the CPU 11 judges whether or not the change of color of the plotted point P is instructed (Step V10) and if it is judged that the change is instructed (Step V10; Yes), the CPU 11 changes the display color of a plotted points P which are identified for displaying (the selected plotted point P1 and the corresponding plotted point P2) (Step V11) and then proceeds to the above-mentioned Step V6.

Moreover, if it is judged in Step V10 that the change of color is not instructed (Step V10; No), the CPU 11 judges whether or not the cursor key 22 is operated (Step V12) and if it is judged that the key is not operated (Step V12; No), the CPU 11 proceeds to the above-mentioned Step V6.

In addition, if it is judged in the Step V12 that the cursor key 22 is operated (Step V12; Yes), the CPU 11 switches the plotted points P to be identified for displaying into an instructed direction (Step V13) and proceeds to the above-mentioned Step V6. More specifically, in Step V13, the CPU 11 switches the selected plotted point P1 into a direction instructed by the cursor key 22 in the right side display area 3B, detects a plotted point P having a coordinate value corresponding to that of the selected plotted point P1 among each plotted point P displayed in the left side display area 3A as a new corresponding plotted point P2 and causes the plotted points P to be identified for displaying.

Further, in a case where it is judged that the key operation is carried out and displaying of the list of the coordinate values is instructed (Step V6; Yes, coordinate value list), the CPU 11 causes the content of the specified coordinate value table data 135S to be displayed on the display 3 (Step V15) and subsequently proceeds to the above-mentioned Step V6. Here, in a case where display color of the plotted point P is changed in the above-mentioned Step V11, the CPU 11 causes the coordinate value of the plotted point with changed display color to be displayed in the changed display color in the Step V15.

1.4 OPERATION EXAMPLE

Subsequently, above-mentioned operation of the alpha calculator 1 will further be explained in detail with reference to the drawings.

Operation Example 1

Figure 10A:
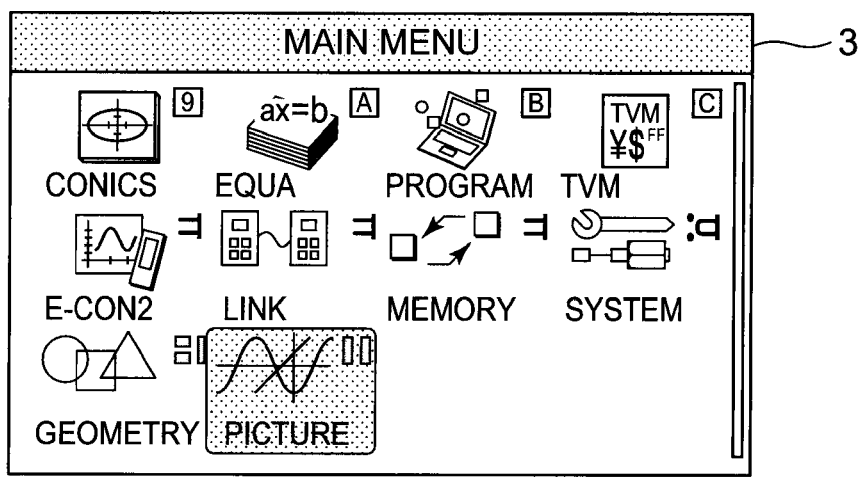
FIGS. 10A and 10B are views showing a display content of a display.
Figure 10B:
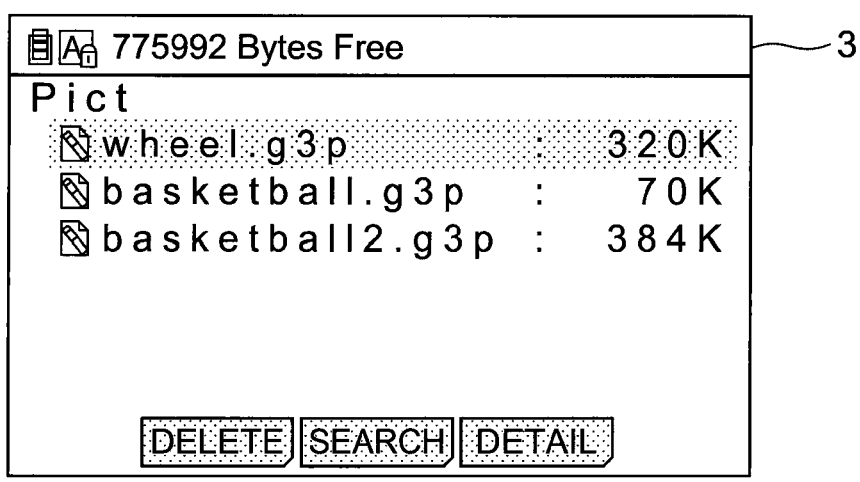

First, as shown in FIG. 10A, a selection menu screen of various modes is displayed on the display 3 (Step S1). If a user carries out selection operation of the picture graph mode in this condition (Step S2; Yes), as shown in FIG. 10B, a selection specifying screen of the image file 132 is displayed on the display 3.

Figure 11A:
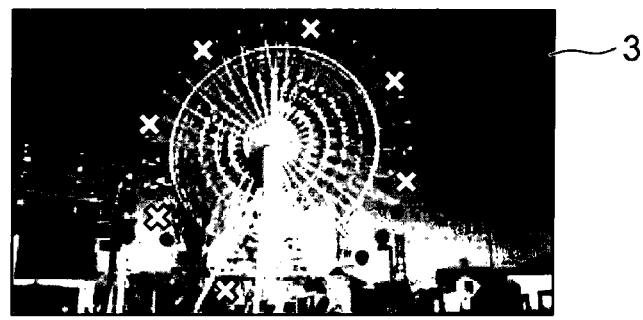
FIGS. 11A to 11D are views showing a display content of a display.

Next, if the user specifies an image file 132 having a file name [wheel.g3p] of the image file group 131 (Step S3), as shown in FIG. 3, the image data 133, the whole image corresponding coordinate range data 138, and the coordinate value table data 135 in the specified image file 132S are read out as the specified image data 133S, the specified whole image corresponding coordinate range data 138S, and the specified coordinate value table data 135S and at the same time the display 3 is set to the full-screen display condition as shown in FIG. 11A so that an image of the specified image data 133S is full-screen displayed in a back layer of the display 3 (Step S4).

Next, it is judged that the specified coordinate value table data 135S includes information of the XY coordinate value (Step S5; Yes), the XY coordinate system within a range indicated by the specified whole image corresponding coordinate range data 138S is set in the front layer of the display screen of the display 3, and plotted points P are displayed at each position indicated by the specified coordinate value table data 135S among each coordinate position of the XY coordinate system (Step S50).

Next, if the user carries out a display instruction operation of the plotted points P in the TY coordinate system (Step S11; Yes), it is judged that there exists data of a coordinate value, which can be plotted in the TY coordinate system, in the specified coordinate value table data 135S (Step S12; Yes).

Next, it is judged that the specified image file 132S does not include the reduced image corresponding coordinate range data 139 (Step W1; No), coordinate values of plotted points P (−12.7, 1.6), (−42.9, 24.2), . . . in the XY coordinate system are read out from the specified coordinate value table data 135S and an approximate curve for the mass of the plotted points P is calculated (Step W11).

Next, it is judged that the approximate curve thus calculated expresses a circle (Step W12; Yes) and that all the plotted points P (analysis target points in the image) in the XY coordinate system cannot be drawn in the left side display area 3A if the image, which is overlapped by the XY coordinate system, of the specified image data 133S is displayed on the left side display area 3A without size reduction (Step W15; No). Then, the image of the specified image data 133S is reduced to half in horizontal direction and half in vertical direction, which is the aspect ratio fixed reduced size (Step W17), and then the processed image part is set as a display content of the back layer of the left side display area 3A on the display 3 (Step W3).

Next, the TY coordinate system is set in the right side display area 3B of the display 3 (Step V3). More specifically, the T axis is set within a range where each coordinate value (0, 10, 20, 30, . . . ) indicated by the specified coordinate value table data 135S is included in the right side display area 3B in the T axis direction while in the Y axis direction the range is the same as the range in the Y axis direction in the left side display area 3A (a range where the upper limit values and the lower limit values respectively match) to set the TY coordinate system in the right side display area 3B.

Figure 11B:
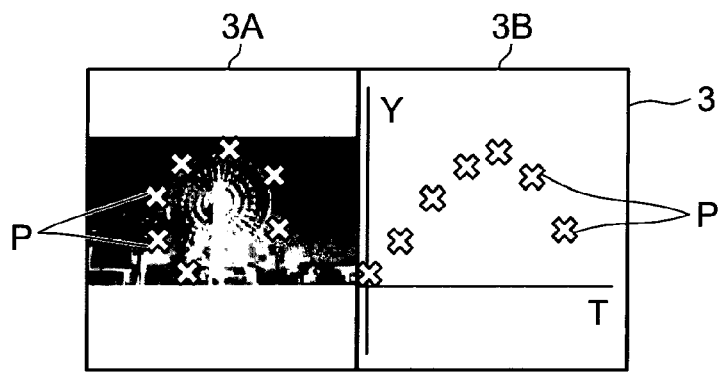

Next, as shown in FIG. 11B, the display 3 is set into the split display condition and the image of the specified image data 133S and the plotted points P are displayed on the left side display area 3A and the plotted points P are displayed on the right side display area 3B on the basis of the above-mentioned setting contents (Step V5). More specifically, the image of the specified image data 133S having a size set by the Steps W3 and W17 that is, a size smaller than the display size in the full-screen display condition, is displayed in the back layer in the left side display area 3A, and the XY coordinate system within a range set by specified whole image corresponding coordinate range data 138S to overlap the image part is set in the front layer of the left side display area 3A. Further, the plotted points P are displayed at each position indicated by the specified coordinate value table data 135S among each coordinate position of the XY coordinate system. Moreover, the TY coordinate system within a range set in Step V3 is set in the right side display area 3B and the plotted points P are displayed at each position indicated by the specified coordinate value table data 135S among each coordinate position of the TY coordinate system.

Figure 11C:
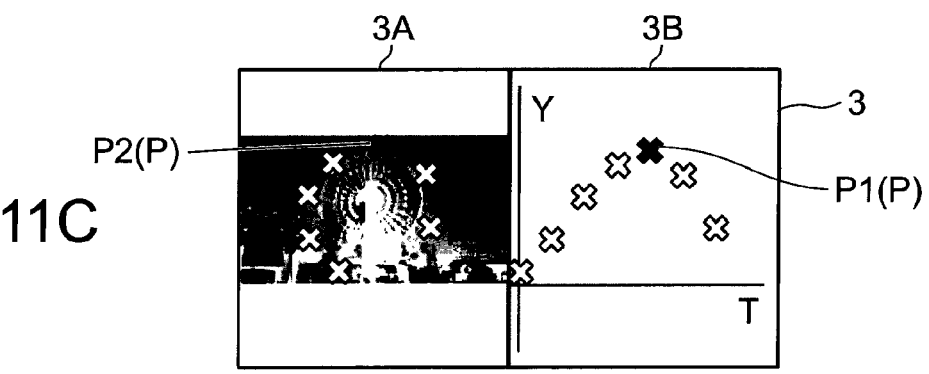

Next, if the user instructs trace of the plotted points P (Step V6; Yes, trace), as shown in FIG. 11C, any one of the plotted points P displayed in the right side display area 3B is selected as the selected plotted point P1. A plotted point P having a corresponding coordinate value to the selected plotted point P1 is detected among the plotted points P displayed in the left side display area 3A as the corresponding plotted point P2, and the selected plotted point P1 and the corresponding plotted point P2 are respectively identified for displaying (Step V9).

Figure 11D:
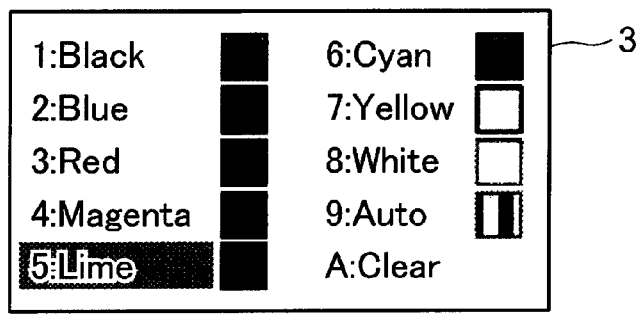

Next, if the user instructs change of color of the plotted points P (Step V10; Yes), display color of the plotted points P (the selected plotted point P1 and the corresponding plotted point P2) which are identified for displaying is changed as shown in FIG. 11D and FIG. 12A (Step V11). Here, FIG. 11D shows a condition where a selection screen of the display color of the plotted point P is displayed on the display 3 and the user selects "lime" as the display color via the selection screen. Moreover, it is assumed that the plotted points P displayed in heavy lines and numerical values indicate that display color thereof is "lime".

Next, if the user instructs display of a list of the coordinate values (Step V6; Yes, coordinate value list), content of the specified coordinate value table data 135S is displayed on the display 3 as shown in FIG. 12B (Step V15). At this time, the coordinate value of the plotted point P with a changed display color is displayed in the changed display color of "lime".

Next, if the user instructs display of an approximate curve (Step V6; Yes, approximate curve), an approximate curve for the mass of plotted points displayed in the right side display area 3B is calculated and is displayed in the right side display area 3B while overlapping the mass of the plotted points P as shown in FIG. 12C (Step V8).

Next, if the user instructs switching of the screens (Step V6; Yes, switching screen), as shown in FIG. 12D, display size of the image of the specified image data 133S in the left side display area 3A is switched to the aspect ratio changed reduced size. At the same time, the XY coordinate system of a range set to overlap the image part displayed in the left side display area 3A is set in the front layer of the left side display area 3A, on the basis of the specified whole image corresponding coordinate range data 138S, and the plotted points P are displayed at each position indicated by the specified coordinate value table data 135S among each of coordinate positions of the XY coordinate system (Step V7). Moreover, at this time, the range in the Y axis direction in the right side display area 3B is reset to be the same range as that in the Y axis direction reset in the left side display area 3A (a range where the upper limit values and the lower limit values respectively match) and the plotted points P are displayed at each position indicated by the specified coordinate value table data 135S among the reset coordinate positions of the TY coordinate system.

Operation Example 2

Figure 13A:
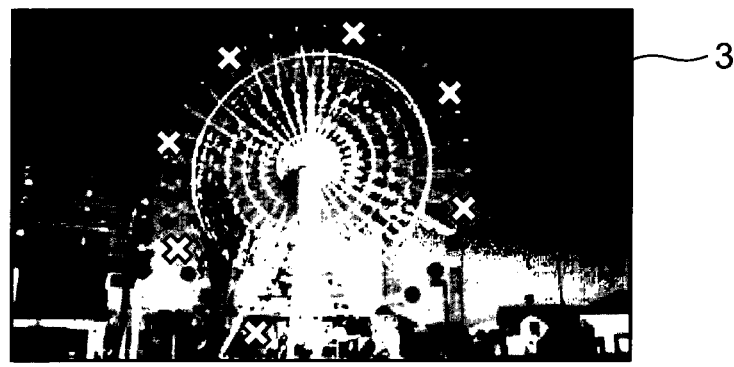
FIGS. 13A and 13B are views showing a display content of a display.

First, similarly to the above-mentioned FIGS. 10A and 10B, from a condition where the selection menu screen of each mode is displayed on the display 3 (Step S1), if a user carries out selection operation of the picture graph mode (Step S2; Yes) and specifies an image file having a file name "wheel.g3p" of the image file group 131 (Step S3), as shown in FIG. 3, the image data 133, the whole image corresponding coordinate range data 138, and the coordinate value table data 135 in the specified image file 132S are read out as the specified image data 133S, the specified whole image corresponding coordinate range data 138S, and the specified coordinate value data 135S. The display 3 is set to the full-screen display condition and the image of the specified image data 133S is full-screen displayed on the back layer of the display 3 as shown in FIG. 13A (Step S4). Here, in the operation example 2, positions of the analysis target points (gondolas) are more concentrated in the center part in horizontal direction in the image compared to the above-mentioned operation example 1.

Next, it is judged that the specified coordinate value table data 135S includes information of the XY coordinate value (Step S5; Yes), an XY coordinate system within a range indicated by the specified whole image corresponding coordinate range data 138S is set in the front layer of the display screen of the display 3, and plotted points P are displayed at each position indicated by the specified coordinate value table data 135S among each coordinate position of the XY coordinate system (Step S50).

Next, if the user carries out display instruction operation of the plotted points P in the TY coordinate system (Step 11; Yes), it is judged that data of a coordinate value which can be plotted in the TY coordinate system exists in the specified coordinate value table data 135S (Step S12; Yes).

Next, it is judged that the specified image file 132S does not include the reduced image corresponding coordinate range data 139 (Step W1; No), coordinate values of plotted points P (−12.7, 1.6), (−42.9, 24.2), . . . in the XY coordinate system are read out from the specified coordinate value table data 135S, and an approximate curve for the mass of these plotted points P is calculated (Step W11).

Next, it is judged that the approximate curve thus calculated is circular (Step W12; Yes). Further, it is judged that in a case where the image of the specified image data 133S is displayed on the left side display area 3A without reducing the size of the image, all the plotted points P in the XY coordinate system overlapping the image can be drawn in the left side display area 3A (Step W15; Yes). Then, the image of the specified image data 133S is trimmed to leave only an image part including all the plotted points (analysis target points) (Step W16), and subsequently the image part thus processed is set as a display content in the back layer of the left side display area 3A on the display 3 (Step W3).

Next, the TY coordinate system is set in the right side display area 3B of the display 3 (Step V3). More specifically, the T axis is set within a range where each coordinate value (0, 10, 20, 30, . . . ) indicated by the specified coordinate value table data 135S is included in the right side display area 3B in the T axis direction while in the Y axis direction the range is the same as the range in the Y axis direction in the left side display area 3A (a range where the upper limit values and the lower limit values respectively match) to set the TY coordinate system in the right side display area 3B.

Figure 13B:
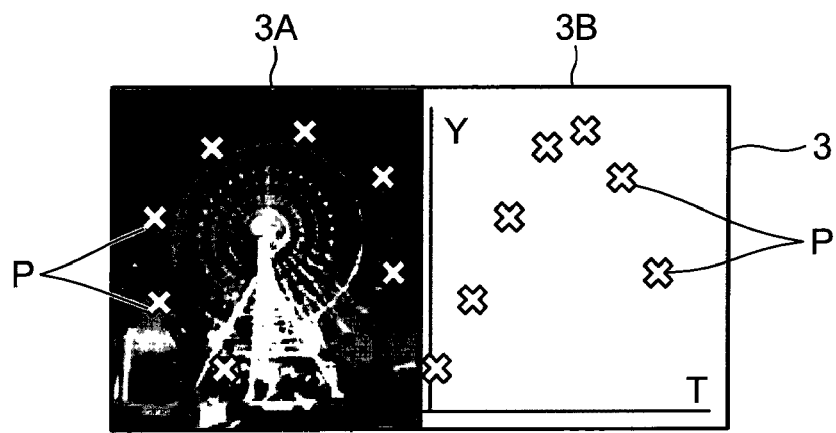

Then, as shown in FIG. 13B, the display 3 is set into the split display condition and the image of the specified image data 133S and the plotted points P are displayed on the left side display area 3A and the plotted points P are displayed on the right side display area 3B on the basis of the above-mentioned setting contents (Step V5). More specifically, the image part of the specified image data 133S after trimming having an image size set by the Steps W3 and W16, that is, a size smaller than the display size in the full-screen display condition, is displayed in the back layer of the left side display area 3A. The XY coordinate system within a range set by the specified whole image corresponding coordinate range data 138S to overlap the image part is set in the front layer of the left side display area 3A, and the plotted points P are displayed at each position indicated by the specified coordinate value table data 135S among each coordinate position of the XY coordinate system. Moreover, the TY coordinate system within a range set in the Step V3 is set on the right side display area 3B and the plotted points P are displayed at each position indicated by the specified coordinate value table data 135S among each coordinate position of the TY coordinate system.

Operation Example 3

Figure 14A:
FIGS. 14A and 14B are views showing a display content of a display.

First, similarly to the FIGS. 10A and 10B, from a condition where the selection menu screen of each mode is displayed on the display 3 (Step S1), a user carries out selection operation of the picture graph mode (Step S2; Yes) and specifies an image file 132 having a file name "basketball.g3p" of the image file group 131 (Step S3). Then, the image data 133, the whole image corresponding coordinate range data 138, and the coordinate value table data 135 of the specified image file 132S are read out as the specified image data 133S, the specified whole image corresponding coordinate range data 138S, and the specified coordinate value data 135S. Further, as shown in FIG. 14A, the display 3 is set to the full-screen display condition and the image of the specified image data 133S is full-screen displayed in the back layer of the display 3 (Step S4).

Next, it is judged that the specified coordinate value table data 135S includes information of the XY coordinate value (Step S5; Yes), an XY coordinate system within a range indicated by the specified whole image corresponding coordinate range data 138S is set in the front layer of the display screen of the display 3, and plotted points P are displayed at each position indicated by the specified coordinate value table data 135S among each coordinate position of the XY coordinate system (Step S50).

Next, if the user carries out display instruction operation of the plotted points P in the TX coordinate system (Step 11; Yes), it is judged that data of a coordinate value which can be plotted in the TX coordinate system exists in the specified coordinate value table data 135S (Step S12; Yes).

Next, it is judged that the specified image file 132S does not include the reduced image corresponding coordinate range data 139 (Step W1; No), coordinate values of plotted points P (2.1, 3.8), (2.5, 4.5), . . . in the XY coordinate system are read out from the specified coordinate value table data 135S, and an approximate curve for the mass of these plotted points P is calculated (Step W11).

Next, it is judged that the approximate curve thus calculated is not circular or regular polygonal (Step W12; No), the image of the specified image data 133S is reduced by half only in horizontal direction (Step W13), and the image part thus processed is set as a display content in the back layer of the left side display area 3A of the display 3 (Step W3).

Next, the TX coordinate system is set on the right side display area 3B of the display 3 (Step V4). More specifically, the T axis is set within a range where each coordinate value (0.19, 0.40, . . . ) indicated by the specified coordinate value table data 135S is included in the right side display area 3B in the T axis direction while in the X axis direction the range is the same as the range in the X axis direction in the left side display area 3A (a range where the upper limit values and the lower limit values respectively match) to set the TX coordinate system in the right side display area 3B.

Figure 14B:
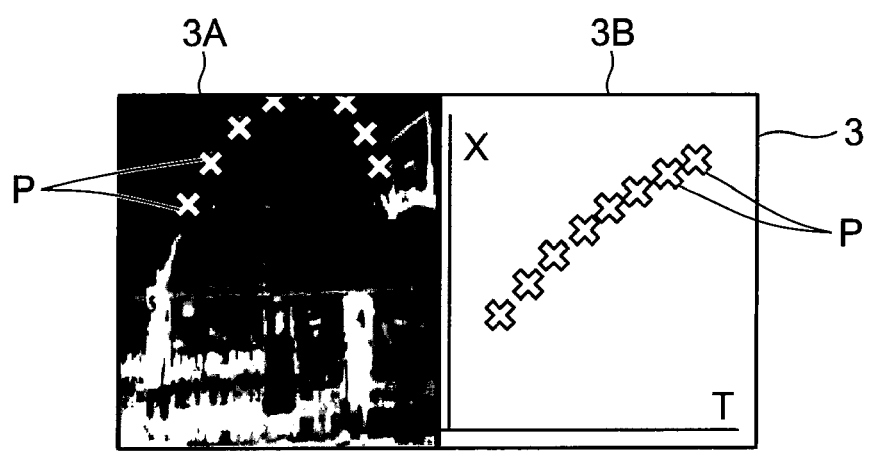

Then, as shown in FIG. 14B, the display 3 is set into the split display condition and the image of the specified image data 133S and the plotted points P are displayed on the left side display area 3A and the plotted points P are displayed on the right side display area 3B on the basis of the above-mentioned setting contents (Step V5). More specifically, the image of the specified image data 133S having a size set by the Steps W3 and W13, that is, a size smaller than the display size in the full-screen display condition, is displayed in the back layer in the left side display area 3A. The XY coordinate system within a range set by specified whole image corresponding coordinate range data 138S to overlap the image part is set in the front layer of the left side display area 3A, and plotted points P are displayed at each position indicated by the specified coordinate value table data 135S among each coordinate position of the XY coordinate system. Moreover, the TX coordinate system within a range set in the Step V3 is set on the right side display area 3B and the plotted points P are displayed at each position indicated by the specified coordinate value table data 135S among each coordinate position of the TX coordinate system.

As described above, according to the present embodiment, as shown in Step V5 of FIG. 8, FIG. 10A, FIG. 10B, FIGS. 11A to 11D, or the like, if any image file 132 of the image file group 131 is specified as the specified image file 132S, the image data 133, the whole image corresponding coordinate range data 138, and the coordinate value table data 135 are read out from specified image file 132S respectively as the specified image data 133S, the specified whole image corresponding coordinate range data 138S, and the specified coordinate value table data 135S. At least a part of the image of the specified image data 133S is displayed on the left side display area 3A. The XY coordinate system in the range overlapping the image part in the specified whole image corresponding coordinate range data 138S is set on the left side display area 3A, and plotted points P are displayed at each position indicated by the specified coordinate value table data 135S among coordinate positions of the XY coordinate system. Therefore, it becomes possible to study by correlating a real life event with the distribution of the plotted points P and at the same time to analyze what mathematical meaning the distribution has.

Moreover, as shown in FIG. 3, Steps V3 and V4 of FIG. 8, FIGS. 11A to 11D, or the like, the coordinate value table data 135 correlates the coordinate value of the T axis with the coordinate value in the XY coordinate system. The TX coordinate system or the TY coordinate system is set in the right side display area 3B, and plotted points P are displayed at each position indicated by the specified coordinate value table data 135S among each coordinate positions of the coordinate system. Therefore, it becomes possible to correlate the distribution of the plotted points P in the three-dimensional space with a real life event by simultaneously referring to the left side display area 3A and the right side display area 3B.

Therefore, it becomes possible to increase user's learning effect more than conventional ones.

Moreover, as shown in the Step V9 of FIG. 8, FIG. 11C, or the like, if a plotted point P displayed in either the left side display area 3A or the right side display area 3B is selected as the selected plotted point P1 on the basis of user operation, a plotted point P having a coordinate value which corresponds to that of the selected plotted point P1 is detected as the corresponding plotted point P2 from among each plotted point P displayed in the other display area and the selected plotted point P1 and the corresponding plotted point P2 can be identified for displaying respectively. Therefore, is becomes possible to easily understand corresponding relation between plotted points in each coordinate system.

In addition, as shown in Step V11 of FIG. 8, FIG. 11D, FIGS. 12A and 12B, or the like, if display color of the plotted points P assumed to be the selected plotted point P1 and the corresponding plotted point P2 is changed on the basis of user operation and content of the specified coordinate value table data 135S is displayed on the basis of the user operation, the coordinate value of the plotted point P with changed display color is displayed in the color after the change. Therefore, it becomes possible to confirm which of the plotted points is subjected to display color change in the coordinate value table.

Further, as shown in Step V9 of FIG. 8, FIG. 11C, or the like, since the one display area is the right side display area 3B, unlike the case where the left side display area 3A in which the plotted points P can be displayed circularly is the one display area, it is possible to prevent existence of a plurality of plotted points P in a direction specified by the cursor key 22. Therefore, it becomes possible to easily select an arbitrary plotted point P by the operation of the cursor key 22.

Further, as shown in the Steps V3 and V4 of FIG. 8, FIG. 11B, FIG. 14B, or the like, in the X axis or Y axis direction in the TX coordinate system or the TY coordinate system, the coordinate system is set in the right side display area 3B within a range where the upper limit values and the lower limit values respectively match in the corresponding axis direction in the left side display area 3A. Therefore, it becomes possible for a user to study by correlating the distribution of the plotted points P in the XY coordinate system and distribution of the plotted points P in the TX coordinate system, TY coordinate system, or TXY coordinate system.

Further, as shown in the Step V7 of FIG. 8, FIG. 12C, FIG. 12D, or the like, the image of the specified image data 133S is displayed in the left side display area 3A by any size selected by the user operation among the three types of sizes of: the aspect ratio changed reduced size by which display size of the image in the full-screen display condition is reduced only in horizontal direction by a predetermined amount to allow the whole of the image of the specified image data 133S to be displayed in the left side display area 3A; the aspect ratio fixed reduced size by which display size of the image in the full-screen display condition is equally reduced in horizontal and vertical directions to allow the whole of the image of the specified image data 133S to be displayed in the left side display area 3A; and the trimming size by which the image of the specified image data 133S is trimmed to leave only the image part including all the analysis target points. At the same time, the XY coordinate system within a range set to overlap the image part displayed in the left side display area 3A is set on the left side display area 3A, on the basis of the specified whole image corresponding coordinate range data 138S. The plotted points P are displayed at each position indicated by the specified coordinate value table data 135S among each coordinate position of the XY coordinate system. Therefore, it becomes possible to cause the image to be displayed by various sizes and to cause the plotted points P to be displayed according to the image.

Further, as shown in Steps W16 and W17 of FIG. 9, FIG. 11B, FIG. 13B, or the like, if it is judged that the approximate curve for the mass of the plotted points P in the XY coordinate system is circular or regular polygonal, the image size of the specified image data 133S displayed in the left side display area 3A is set to be the aspect ratio fixed reduced size or the trimming size. Therefore, it becomes possible to reduce the image size of the specified image data 133S to be displayed without deforming the shape expressed by the mass of the plotted points P. On the other hand, as shown in the Step W13 of FIG. 9, FIG. 14B, or the like, if it is judged that the approximate curve is not circular or regular polygonal, the image size of the specified image data 133S displayed in the left side display area 3A is set to be the aspect ratio changed reduced size. Therefore, it becomes possible to prevent the image from becoming too small compared to a case where the image is reduced equally in horizontal and vertical directions.

Here, it is needless to say that the details of each configuration element and details of operation of the alpha calculator 1 in the above-mentioned embodiment can be changed appropriately without departing from the scope of the present invention.

For example, the explanation was given on an assumption that the display apparatus according the present invention is the alpha calculator 1. However, the present invention can be applied not only to such a product but to electric devices in general such as a cellular phone, a personal computer, a personal digital assistant (PDA), a game machine. Moreover, the information display program 130 and the image file group 131 according to the present invention may be stored in a memory card, a CD, or the like which can be detachably attached to the alpha calculator 1.

Further, the explanation was given on an assumption that the coordinate axis of each coordinate system are X axis, Y axis, or T axis. However, other coordinate axis names may be used. Further, the explanation was on an assumption that the coordinate system is an orthogonal coordinate system. However, the coordinate system may be other coordinate system such as an oblique coordinate system or a polar coordinate system. Further, the explanation was given on an assumption that the TX coordinate system or the TY coordinate system is set in the right side display area 3B. However, an XYT coordinate system may be set.

What is claimed is:

1. A display apparatus comprising:
    a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis;
    a memory which stores at least one image file including image data, coordinate range data indicating a range of the first coordinate system set to overlap an image of the image data, and coordinate value table data indicating coordinate values in the first coordinate system of each of analysis target points previously set in the image; and
    a processor which performs processing comprising:
    image file specifying processing which specifies any one of the at least one image file stored in the memory as a specified image file based on a user operation;
    display processing which (i) reads out from the specified image file, the image data as specified image data, the coordinate range data as specified coordinate range data, and the coordinate value table data as specified coordinate value table data, (ii) controls a display of at least a part of an image part of the image of the specified image data, in the first display area of the display section, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system,
    wherein the coordinate value table data correlates a coordinate value of the third coordinate axis with the coordinate values in the first coordinate system, and
    wherein the display processing sets the second coordinate system in the second display area based on the specified coordinate value table data, and controls a display of plotted points at each position indicated by the specified coordinate value table data among each coordinate position of the second coordinate system.

2. The display apparatus according to claim 1, wherein the processor further performs processing of:
    plotted point selection processing which selects any one of the plotted points displayed in one of the first display area and the second display area as a selected plotted point based on a user operation; and
    plotted point identification display processing which detects as a corresponding plotted point a plotted point having coordinate values corresponding to the coordinate values of the selected plotted point among each of the plotted points displayed in the other display area, and which identifies and displays the selected plotted point and the corresponding plotted point, respectively.

3. The display apparatus according to claim 2, wherein the processor further performs processing of:
    color changing processing which changes a first display color of the plotted points assigned to be the selected plotted point and the corresponding plotted point; and
    coordinate value display processing which controls the display of a content of the specified coordinate value table data on the display section, based on a user operation, wherein the coordinate value display processing controls the display of the coordinate values of the plotted points to be displayed in a second display color changed from the first display color by the color changing processing.

4. The display apparatus according to claim 2, wherein the one display area is the second display area.

5. The display apparatus according to claim 1, wherein the display processing performed by the processor sets the second coordinate system in the second display area so that:
    in an axis direction of the third coordinate axis in the second coordinate system, each coordinate value indicated by the specified coordinate value table data regarding the third coordinate axis is included in the second display area; and
    in an axis direction of the at least one of the first and the second coordinate axes in the second coordinate system, an upper limit value and a lower limit value respectively match an upper limit value and a lower limit value in the corresponding axis direction in the first display area.

6. The display apparatus according to claim 1, wherein the first coordinate system is an orthogonal coordinate system determined by an X axis and a Y axis, and the second coordinate system is an orthogonal coordinate system determined by a T axis, and at least one coordinate axis selected from the X axis and the Y axis in response to a user operation.

7. The display apparatus according to claim 1, wherein the display section includes the first display area and the second display area in split areas obtained by splitting a display screen in a horizontal direction or a vertical direction, and can switch display conditions between a split display condition in which the display screen is split into the first display area and the second display area, and a full-screen display condition in which the display is performed without splitting the display screen, wherein the processor further performs processing of:

full-screen display processing which (i) makes the display section be in the full-screen display condition, when the specified image file is specified by the image file specifying processing, (ii) displays the image of the specified image data on the display section in a full-screen, (iii) sets the first coordinate system within the range indicated by the specified coordinate range data on the display screen, and (iv) controls the display of the plotted points at each position indicated by the specified coordinate value table data among each coordinate position of the first coordinate system;

split display processing which (i) switches the display section from the display condition controlled by the full-screen display processing to the split display condition in response to a user operation, (ii) controls the display of the at least the part of the image part of the image of the specified image data so as to be displayed in the first display area in a size smaller than a display size of the full-screen display condition, (iii) sets the first coordinate system within the range set to overlap the image part in the specified coordinate range data in the first display area, (iv) controls the display of the plotted points at each position indicated by the specified coordinate value table data among each coordinate position of the first coordinate system, (v) sets the second coordinate system in the second display area based on the specified coordinate value table data, and (vi) controls the display of the plotted points at each position indicated by the specified coordinate value table data among each coordinate position of the second coordinate system; and display mode changing processing which changes an image size of the specified image data displayed on the first display area in response to a user operation from the display condition controlled by the split display processing, wherein the display mode changing processing controls the display of the image of the specified image data in the first display area in any one of sizes selected by the user operation, the sizes including:
  a first display size by which the display size of the image in the full-screen display condition is reduced by a predetermined amount, in either the vertical direction or the horizontal direction in which the first display area and the second display area are split, so that a whole of the image of the specified image data can be displayed in the first display area,
  a second display size by which the display size of the image in the full-screen display condition is reduced equally in the vertical and the horizontal directions so that the whole of the image of the specified image data can be displayed in the first display area, and
  a third display size by which the image of the specified image data is trimmed to leave only an image part including all the analysis target points, and wherein the display mode changing processing further sets in the first display area the first coordinate system within the range set to overlap the image part displayed in the first display area based on the specified coordinate range data, and controls the display of the plotted points at each position indicated by the specified coordinate value table data among each coordinate position of the first coordinate system.

8. The display apparatus according to claim 7, wherein the split display processing performed by the processor includes:
approximate curve calculation processing which calculates an approximate curve for a mass of the plotted points in the first coordinate system, and which judges whether or not the calculated approximate curve is circular or regular polygonal; and display mode setting processing which sets the image size of the specified image data to be displayed in the first display area based on a judgment result by the approximate curve calculation processing, and wherein the display mode setting processing (i) sets the image size of the specified image data to be displayed in the first display area to the second display size or the third display size, when the approximate curve is judged to be circular or regular polygonal by the approximate curve calculation processing, and (ii) sets the image size of the specified image data to be displayed in the first display area to the first display size, when the approximate curve is judged not to be either circular or regular polygonal by the approximate curve calculation processing.

9. A non-transitory computer readable storage medium having a program stored thereon, the program causing a computer to execute processing, the computer comprising: a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis; and a memory which stores at least one image file including image data, coordinate range data indicating a range of the first coordinate system set to overlap an image of the image data, and coordinate value table data indicating coordinate values in the first coordinate system of each of analysis target points previously set in the image, the processing including:
  an image file specifying function which specifies any one of the at least one image file stored in the memory as a specified image file based on a user operation;
  a display function which (i) reads out from the specified image file, the image data as specified image data, the coordinate range data as specified coordinate range data, and the coordinate value table data as specified coordinate value table data, (ii) controls a display of at least a part of an image part of the image of the specified image data, in the first display area of the display section, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system,
  wherein the coordinate value table data correlates a coordinate value of the third coordinate axis with the coordinate values in the first coordinate system, and
  wherein the display function sets the second coordinate system in the second display area based on the specified coordinate value table data, and controls a display of plotted points at each position indicated by the specified coordinate value table data among each coordinate position of the second coordinate system.

10. A display apparatus comprising:
a display section which includes a first display area and a second display area, which can set for the first display area a first coordinate system determined by a first coordinate axis and a second coordinate axis, and which can set for the second display area a second coordinate system determined by a third coordinate axis and at least one of the first coordinate axis and the second coordinate axis;

an image file storage section which stores at least one image file including image data, coordinate range data indicating a range of the first coordinate system set to overlap an image of the image data, and coordinate value table data indicating coordinate values in the first coordinate system of each of analysis target points previously set in the image;

an image file specifying section which specifies any one of the at least one image file stored in the image file storage section as a specified image file based on a user operation;

a display control section which (i) reads out from the specified image file, the image data as specified image data, the coordinate range data as specified coordinate range data, and the coordinate value table data as specified coordinate value table data, (ii) controls a display of at least a part of an image part of the image of the specified image data, in the first display area, (iii) sets the first coordinate system which is within a range set to overlap the image part in the specified coordinate range data, in the first display area, and (iv) controls a display of plotted points at each position indicated by the specified coordinate value table data among each coordinate position of the first coordinate system, wherein the coordinate value table data correlates a coordinate value of the third coordinate axis with the coordinate values in the first coordinate system, and wherein the display control section sets the second coordinate system in the second display area based on the specified coordinate value table data, and controls a display of plotted points at each position indicated by the specified coordinate value table data among each coordinate position of the second coordinate system.

11. The display apparatus according to claim 10, further comprising:

a plotted point selection section which selects any one of the plotted points displayed in one of the first display area and the second display area as a selected plotted point based on a user operation; and a plotted point identification display section which detects as a corresponding plotted point a plotted point having coordinate values corresponding to the coordinate values of the selected plotted point among each of the plotted points displayed in the other display area, and which identifies and displays the selected plotted point and the corresponding plotted point, respectively.

12. The display apparatus according to claim 11, further comprising:

a plot display color changing section which changes a first display color of the plotted points assigned to be the selected plotted point and the corresponding plotted point; and a coordinate value display control section which controls the display of a content of the specified coordinate value table data on the display section, based on a user operation, wherein the coordinate value display control section controls the display of the coordinate values of the plotted points to be displayed in a second display color changed from the first display color by the plot display color changing section.

13. The display apparatus according to claim 11, wherein the one display area is the second display area.

14. The display apparatus according to claim 10, wherein the display control section sets the second coordinate system in the second display area so that:

in an axis direction of the third coordinate axis in the second coordinate system, each coordinate value indicated by the specified coordinate value table data regarding the third coordinate axis is included in the second display area; and in an axis direction of the at least one of the first and the second coordinate axes in the second coordinate system, an upper limit value and a lower limit value respectively match an upper limit value and a lower limit value in the corresponding axis direction in the first display area.

15. The display apparatus according to claim 10, wherein the first coordinate system is an orthogonal coordinate system determined by an X axis and a Y axis, and the second coordinate system is an orthogonal coordinate system determined by a T axis, and at least one coordinate axis selected from the X axis and the Y axis in response to a user operation.

16. The display apparatus according to claim 10, wherein the display section includes the first display area and the second display area in split areas obtained by splitting a display screen in a horizontal direction or a vertical direction, and can switch display conditions between a split display condition in which the display screen is split into the first display area and the second display area, and a full-screen display condition in which the display is performed without splitting the display screen, wherein the display control section includes:

a full-screen display control section which (i) makes the display section be in the full-screen display condition, when the specified image file is specified by the image file specifying section, (ii) displays the image of the specified image data on the display section in a full-screen, (iii) sets the first coordinate system within the range indicated by the specified coordinate range data on the display screen, and (iv) controls the display of the plotted points at each position indicated by the specified coordinate value table data among each coordinate position of the first coordinate system;

a split display control section which (i) switches the display section from the display condition controlled by the full-screen display control section to the split display condition in response to a user operation, (ii) controls the display of the at least the part of the image part of the image of the specified image data so as to be displayed in the first display area in a size smaller than a display size of the full-screen display condition, (iii) sets the first coordinate system within the range set to overlap the image part in the specified coordinate range data in the first display area, (iv) controls the display of the plotted points at each position indicated by the specified coordinate value table data among each coordinate position of the first coordinate system, (v) sets the second coordinate system in the second display area based on the specified coordinate value table data, and (vi) controls the display of the plotted points at each position indicated by the specified coordinate value table data among each coordinate position of the second coordinate system; and a display mode changing section which changes an image size of the specified image data displayed on the first display area in response to a user operation from the display condition controlled by the split display control section, wherein the display mode changing section controls the display of the image of the specified image data in the first display area in any one of sizes selected by the user operation, the sizes including:

a first display size by which the display size of the image in the full-screen display condition is reduced by a predetermined amount, in either the vertical direction or the horizontal direction in which the first display area and the second display area are split, so that a whole of the image of the specified image data can be displayed in the first display area, a second display size by which the display size of the image in the full-screen display condition is reduced equally in the vertical and the horizontal directions so that the whole of the image of the specified image data can be displayed in the first display area, and a third display size by which the image of the specified image data is trimmed to leave only an image part including all the analysis target points, and wherein the display mode changing section further sets in the first display area the first coordinate system within the range set to overlap the image part displayed in the first display area based on the specified coordinate range data, and controls the display of the plotted points at each position indicated by the specified coordinate value table data among each coordinate position of the first coordinate system.

17. The display apparatus according to claim 16, wherein the split display control section includes:

an approximate curve calculation section which calculates an approximate curve for a mass of the plotted points in the first coordinate system, and which judges whether or not the calculated approximate curve is circular or regular polygonal; and a display mode setting section which sets the image size of the specified image data to be displayed in the first display area based on a judgment result by the approximate curve calculation section, and wherein the display mode setting section (i) sets the image size of the specified image data to be displayed in the first display area to the second display size or the third display size, when the approximate curve is judged to be circular or regular polygonal by the approximate curve calculation section, and (ii) sets the image size of the specified image data to be displayed in the first display area to the first display size, when the approximate curve is judged not to be either circular or regular polygonal by the approximate curve calculation section.

* * * * *